United States Patent
Saitoh et al.

(10) Patent No.: US 11,796,880 B2
(45) Date of Patent: Oct. 24, 2023

(54) LIQUID CRYSTAL DIFFRACTION ELEMENT AND LAMINATED DIFFRACTION ELEMENT

(71) Applicant: FUJIFILM Corporation, Tokyo (JP)

(72) Inventors: Yukito Saitoh, Minamiashigara (JP); Katsumi Sasata, Minamiashigara (JP); Hiroshi Sato, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 227 days.

(21) Appl. No.: 17/521,595

(22) Filed: Nov. 8, 2021

(65) Prior Publication Data

US 2022/0066075 A1 Mar. 3, 2022

Related U.S. Application Data

(63) Continuation of application No. PCT/JP2020/017764, filed on Apr. 24, 2020.

(30) Foreign Application Priority Data

May 9, 2019 (JP) .................................. 2019-088975

(51) Int. Cl.
*G02F 1/137* (2006.01)
*G02B 5/18* (2006.01)
*G02F 1/29* (2006.01)

(52) U.S. Cl.
CPC ....... *G02F 1/13718* (2013.01); *G02B 5/1814* (2013.01); *G02F 1/292* (2013.01)

(58) Field of Classification Search
None
See application file for complete search history.

(56) References Cited

U.S. PATENT DOCUMENTS 11,460,729 B2 * 10/2022 Saitoh ................. G02F 1/13718
2002/0003601 A1 * 1/2002 Wang ....................... G02F 1/292
349/202

(Continued)

FOREIGN PATENT DOCUMENTS

JP 2017-522601 A 8/2017
WO WO 2016/194961 A1 12/2018

OTHER PUBLICATIONS

International Preliminary Report on Patentability and Written Opinion of the International Searching Authority for International Application No. PCT/JP2020/017764, dated Nov. 18, 2021, with an English translation.

(Continued)

*Primary Examiner* — Dung T Nguyen
(74) *Attorney, Agent, or Firm* — Birch, Stewart, Kolasch & Birch, LLP

(57) ABSTRACT

Provided are a liquid crystal diffraction element that diffracts incident light while allowing transmission of the incident light and has wavelength selectivity, and a laminated diffraction element. The liquid crystal diffraction element includes: a first cholesteric liquid crystal layer obtained by cholesteric alignment of a liquid crystal compound; and a second cholesteric liquid crystal layer that is laminated on the first cholesteric liquid crystal layer, in which the first cholesteric liquid crystal layer and the second cholesteric liquid crystal layer have a liquid crystal alignment pattern in which a direction of an optical axis derived from the liquid crystal compound changes while continuously rotating in at least one in-plane direction, a selective reflection wavelength of the first cholesteric liquid crystal layer and a selective reflection wavelength of the second cholesteric liquid crystal layer are the same, and in a case where a length over which the direction of the optical axis derived from the liquid crystal compound in the liquid crystal alignment (Continued)

pattern rotates by 180° in a plane is set as a single period, a single period of the liquid crystal alignment pattern of the first cholesteric liquid crystal layer and a single period of the liquid crystal alignment pattern of the second cholesteric liquid crystal layer are different from each other.

20 Claims, 7 Drawing Sheets

(56) References Cited

U.S. PATENT DOCUMENTS

| | | |
|---|---|---|
| 2016/0033698 A1 | 2/2016 | Escuti et al. |
| 2018/0143438 A1 | 5/2018 | Oh |
| 2018/0164480 A1 | 6/2018 | Yoshida |
| 2018/0164627 A1 | 6/2018 | Oh |

OTHER PUBLICATIONS

International Search Report for International Application No. PCT/JP2020/017764, dated Jul. 14, 2020, with an English translation.

* cited by examiner

LIQUID CRYSTAL DIFFRACTION ELEMENT AND LAMINATED DIFFRACTION ELEMENT

CROSS-REFERENCE TO RELATED APPLICATIONS

This application is a Continuation of PCT International Application No. PCT/JP2020/017764 filed on Apr. 24, 2020, which claims priority under 35 U.S.C. § 119(a) to Japanese Patent Application No. 2019-088975 filed on May 9, 2019. The above application is hereby expressly incorporated by reference, in its entirety, into the present application.

BACKGROUND OF THE INVENTION

1. Field of the Invention

The present invention relates a liquid crystal diffraction element that diffracts incident light and a laminated diffraction element including the liquid crystal diffraction element.

2. Description of the Related Art

A diffraction element that diffracts light to control a traveling direction of the light is used in various optical devices or systems.

For example, the diffraction element that diffracts light is used in various optical devices, for example, a transmission type lens, a transmission type prism, a projector, a beam steering, or a sensor for, for example, detecting an object and measuring the distance to an object.

As this diffraction element, a liquid crystal diffraction element formed of a liquid crystal compound is disclosed.

For example, JP2017-522601A describes an optical element comprising a plurality of stacked birefringent sublayers configured to alter a direction of propagation of light passing therethrough according to a Bragg condition, in which the stacked birefringent sublayers respectively comprise local optical axes that vary along respective interfaces between adjacent ones of the stacked birefringent sublayers to define respective grating periods. The optical element described in JP2017-522601A diffracts incident light while allowing transmission of the incident light.

In addition, WO2016/194961A discloses a reflective structure comprising: a plurality of helical structures each extending in a predetermined direction; a first incidence surface that intersects the predetermined direction and into which light is incident; and a reflecting surface that intersects the predetermined direction and reflects the light incident from the first incidence surface, in which the first incidence surface includes one of end portions in each of the plurality of helical structures, each of the plurality of helical structures includes a plurality of structural units that lies in the predetermined direction, each of the plurality of structural units includes a plurality of elements that are helically turned and laminated, each of the plurality of structural units includes a first end portion and a second end portion, the second end portion of one structural unit among structural units adjacent to each other in the predetermined direction forms the first end portion of the other structural unit, alignment directions of the elements positioned in the plurality of first end portions included in the plurality of helical structures are aligned, the reflecting surface includes at least one first end portion included in each of the plurality of helical structures, and the reflecting surface is not parallel to the first incidence surface. WO2016/194961A describes a helical structure obtained by cholesteric alignment of a liquid crystal compound. In addition, a reflective structure described in WO2016/194961A reflects and diffracts incident light.

SUMMARY OF THE INVENTION

As is well known, the cholesteric liquid crystal layer having the cholesteric structure has wavelength-selective reflectivity. Therefore, the reflective structure described in WO2016/194961A reflects and diffracts light having a selective reflection wavelength in incident light and allows transmission of light having the other wavelength ranges in the incident light. On the other hand, the optical element described in JP2017-522601A has weak wavelength selectivity and thus diffracts incident light in the entire wavelength range while allowing transmission of the incident light.

On the other hand, regarding a liquid crystal diffraction element that diffracts incident light while allowing transmission of the incident light, a liquid crystal diffraction element having strong wavelength selectivity has yet to be disclosed.

An object of the present invention is to provide a liquid crystal diffraction element that diffracts incident light while allowing transmission of the incident light and has wavelength selectivity, and a laminated diffraction element.

In order to achieve the object, the present invention has the following configurations.

[1] A liquid crystal diffraction element comprising:
 a first cholesteric liquid crystal layer obtained by cholesteric alignment of a liquid crystal compound; and
 a second cholesteric liquid crystal layer that is laminated on the first cholesteric liquid crystal layer,
 in which the first cholesteric liquid crystal layer and the second cholesteric liquid crystal layer have a liquid crystal alignment pattern in which a direction of an optical axis derived from the liquid crystal compound changes while continuously rotating in at least one in-plane direction,
 a selective reflection wavelength of the first cholesteric liquid crystal layer and a selective reflection wavelength of the second cholesteric liquid crystal layer are the same, and
 in a case where a length over which the direction of the optical axis derived from the liquid crystal compound in the liquid crystal alignment pattern rotates by 180° in a plane is set as a single period, a single period of the liquid crystal alignment pattern of the first cholesteric liquid crystal layer and a single period of the liquid crystal alignment pattern of the second cholesteric liquid crystal layer are different from each other.

[2] The liquid crystal diffraction element according to [1],
 in which the single period of the liquid crystal alignment pattern of the first cholesteric liquid crystal layer is less than the selective reflection wavelength of the first cholesteric liquid crystal layer, and
 the single period of the liquid crystal alignment pattern of the second cholesteric liquid crystal layer is less than the selective reflection wavelength of the second cholesteric liquid crystal layer.

[3] The liquid crystal diffraction element according to [1] or [2],
 in which a twisted direction of a helical structure of the first cholesteric liquid crystal layer and a twisted direction of a helical structure of the second cholesteric liquid crystal layer are the same.

[4] The liquid crystal diffraction element according to any one of [1] to [3],
in which the one in-plane direction in the liquid crystal alignment pattern of the first cholesteric liquid crystal layer matches the one in-plane direction in the liquid crystal alignment pattern of the second cholesteric liquid crystal layer.

[5] The liquid crystal diffraction element according to any one of [1] to [4],
in which at least one of the first cholesteric liquid crystal layer or the second cholesteric liquid crystal layer has regions in which different lengths of the single period of the liquid crystal alignment pattern are different in a plane.

[6] The liquid crystal diffraction element according to any one of [1] to [4],
in which the liquid crystal alignment pattern of each of the first cholesteric liquid crystal layer and the second cholesteric liquid crystal layer is a concentric circular pattern having a concentric circular shape where the one in-plane direction in which the direction of the optical axis derived from the liquid crystal compound changes while continuously rotating moves from an inside toward an outside.

[7] A laminated diffraction element comprising:
two or more liquid crystal diffraction elements according to any one of [1] to [6],
in which selective wavelengths of the liquid crystal diffraction elements are different from each other.

According to the present invention, it is possible to provide a liquid crystal diffraction element that diffracts incident light while allowing transmission of the incident light and has wavelength selectivity, and a laminated diffraction element.

DESCRIPTION OF THE PREFERRED EMBODIMENTS

Hereinafter, a liquid crystal diffraction element and a laminated diffraction element according to an embodiment of the present invention will be described in detail based on a preferred embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

[Liquid Crystal Diffraction Element]
The liquid crystal diffraction element according to the embodiment of the present invention comprises:
a first cholesteric liquid crystal layer obtained by cholesteric alignment of a liquid crystal compound; and
a second cholesteric liquid crystal layer that is laminated on the first cholesteric liquid crystal layer,
in which the first cholesteric liquid crystal layer and the second cholesteric liquid crystal layer have a liquid crystal alignment pattern in which a direction of an optical axis derived from the liquid crystal compound changes while continuously rotating in at least one in-plane direction,
a selective reflection wavelength of the first cholesteric liquid crystal layer and a selective reflection wavelength of the second cholesteric liquid crystal layer are the same, and
in a case where a length over which the direction of the optical axis derived from the liquid crystal compound in the liquid crystal alignment pattern rotates by 180° in a plane is set as a single period, a single period of the liquid crystal alignment pattern of the first cholesteric liquid crystal layer and a single period of the liquid crystal alignment pattern of the second cholesteric liquid crystal layer are different from each other.

Figure 1:
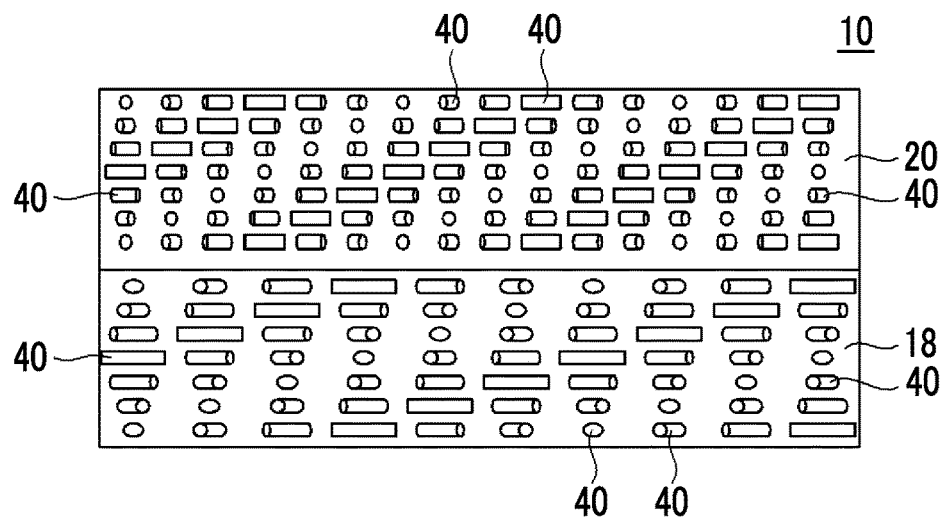
FIG. 1 is a cross-sectional view conceptually showing an example of a liquid crystal diffraction element according to the present invention.

FIG. 1 conceptually shows an example of the liquid crystal diffraction element according to the present invention.

A liquid crystal diffraction element 10 shown in FIG. 1 includes a first cholesteric liquid crystal layer 18 and a second cholesteric liquid crystal layer 20. A length of a liquid crystal compound 40 of the first cholesteric liquid crystal layer 18 and a length of a liquid crystal compound 40 in the second cholesteric liquid crystal layer 20 are different from each other in FIG. 1 but may be the same as each other.

In addition, in FIG. 1, the number of helices in a helical structure (cholesteric structure) in a thickness direction of the first cholesteric liquid crystal layer 18 and the second cholesteric liquid crystal layer 20 is half of a pitch. Actually, a helical structure corresponding to at least several pitches is provided.

As shown in FIG. 1, the first cholesteric liquid crystal layer 18 and the second cholesteric liquid crystal layer 20 are laminated.

A selective reflection wavelength of the first cholesteric liquid crystal layer 18 and a selective reflection wavelength of the second cholesteric liquid crystal layer 20 are the same. In the present invention, in a case where the selective reflection wavelengths are the same, there is an error range that is generally allowable in the technical field, and a ratio between one selective reflection wavelength and another selective reflection wavelength is ±10% or less, preferably ±5% or less, and more preferably ±1% or less.

The selective reflection wavelength (selective reflection center wavelength) of the cholesteric liquid crystal layer depends on a pitch (=helical period) of a helical structure in the cholesteric liquid crystalline phase (cholesteric structure). Therefore, the selective reflection wavelength can be adjusted by adjusting the pitch of the helical structure.

The first cholesteric liquid crystal layer 18 and the second cholesteric liquid crystal layer 20 have a liquid crystal alignment pattern in which a direction of an optical axis derived from the liquid crystal compound changes while continuously rotating in at least one in-plane direction.

By having the above-described liquid crystal alignment pattern, the first cholesteric liquid crystal layer 18 and the second cholesteric liquid crystal layer 20 can diffract light in a selective reflection wavelength to be reflected. In this case, in a case where a length over which the direction of the optical axis derived from the liquid crystal compound in the liquid crystal alignment pattern rotates by 180° in a plane is set as a single period (hereinafter also referred to as the single period of the liquid crystal alignment pattern), the diffraction angle depends on the length of the single period and the pitch of the helical structure. Therefore, the diffraction angle can be adjusted by adjusting the single period of the liquid crystal alignment pattern.

Here, in the present invention, the single period of the liquid crystal alignment pattern of the first cholesteric liquid crystal layer 18 and the single period of the liquid crystal alignment pattern of the second cholesteric liquid crystal layer 20 are different from each other. The liquid crystal diffraction element according to the embodiment of the present invention having the above-described configuration diffracts predetermined light in incident light while allowing transmission of the light. That is, the liquid crystal diffraction element according to the embodiment of the present invention can realize a transmission type diffraction element having wavelength selectivity. This action will be described below in detail.

(Cholesteric Liquid Crystal Layer)

The first cholesteric liquid crystal layer 18 and the second cholesteric liquid crystal layer 20 will be described using FIGS. 2 and 3. The first cholesteric liquid crystal layer 18 and the second cholesteric liquid crystal layer 20 have the same configuration, except that the lengths of the single periods of the liquid crystal alignment patterns are different from each other. Therefore, in a case where it is not necessary to distinguish between the first cholesteric liquid crystal layer 18 and the second cholesteric liquid crystal layer 20, the first cholesteric liquid crystal layer 18 and the second cholesteric liquid crystal layer 20 will also be collectively referred to as "cholesteric liquid crystal layer".

An example of the cholesteric liquid crystal layer will be described, for example, using FIGS. 2 and 3.

Figure 2:
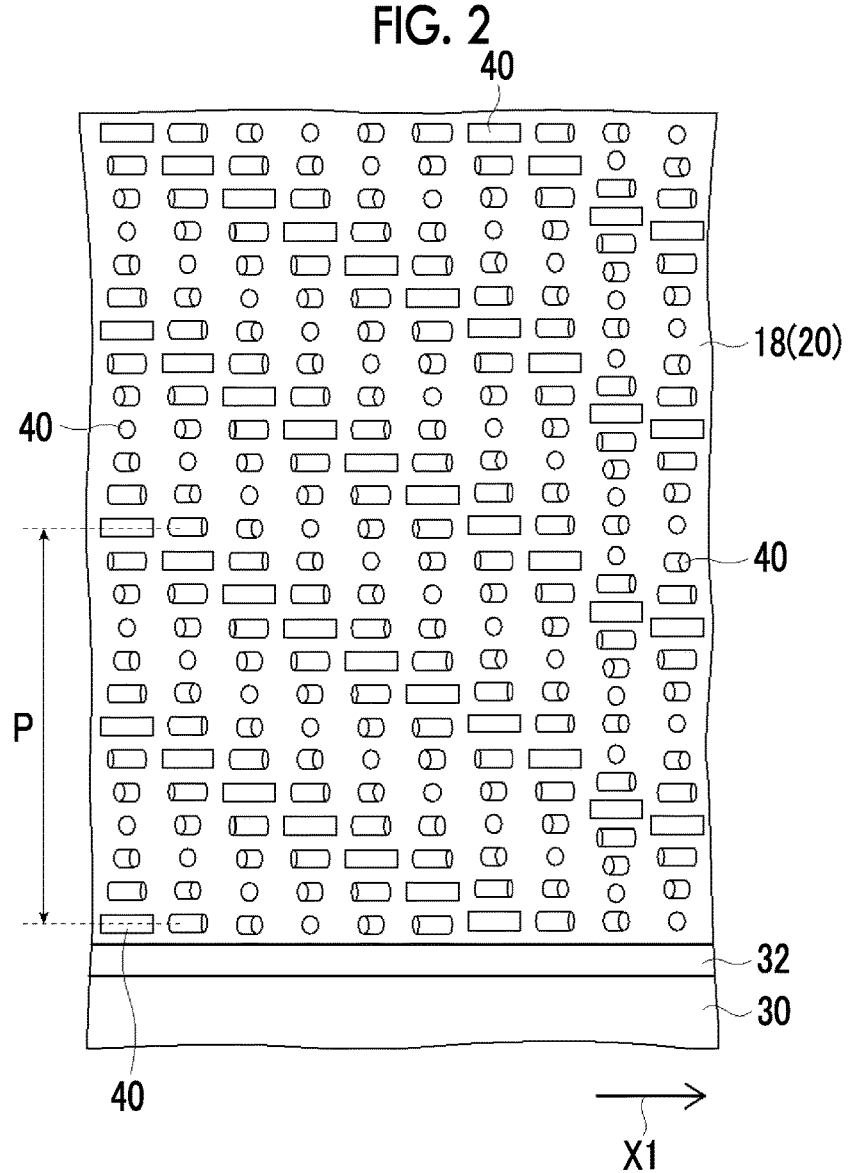
FIG. 2 is a diagram conceptually showing a cholesteric liquid crystal layer in the liquid crystal diffraction element shown in FIG. 1.
Figure 3:
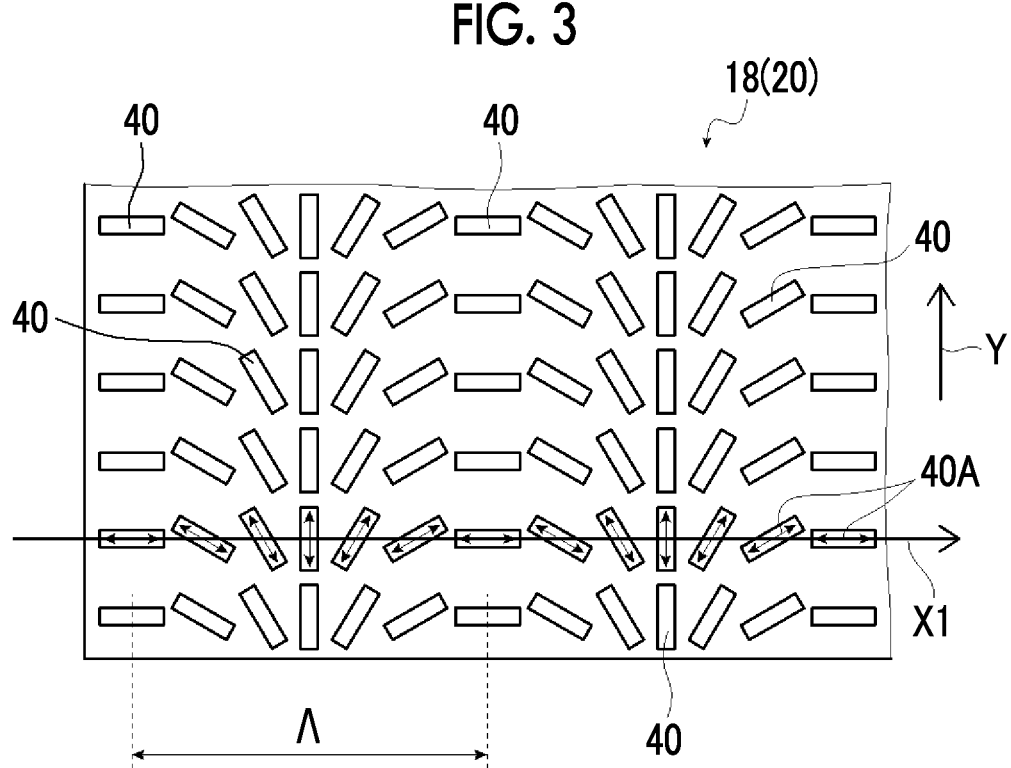
FIG. 3 is a front view showing the cholesteric liquid crystal layer shown in FIG. 2.

The cholesteric liquid crystal layer shown in FIGS. 2 and 3 is obtained by immobilizing a cholesteric liquid crystalline phase obtained by a cholesteric alignment of a liquid crystal compound, and has a liquid crystal alignment pattern in which a direction of an optical axis derived from a liquid crystal compound changes while continuously rotating in at least one in-plane direction.

In the example shown in FIG. 2, the cholesteric liquid crystal layer 18 (20) is laminated on an alignment film 32 laminated on the support 30.

In a case where the first cholesteric liquid crystal layer and the second cholesteric liquid crystal layer are laminated as the liquid crystal diffraction element, the cholesteric liquid crystal layer may be laminated in a state where it is laminated on the support 30 and the alignment film 32 as in the example shown in FIG. 2. Alternatively, for example, the cholesteric liquid crystal layer may be laminated in a state where the support 30 is peeled off and only the alignment film 32 and the cholesteric liquid crystal layer are laminated. Alternatively, for example, the cholesteric liquid crystal layer may be laminated in a state where the support 30 and the alignment film 32 are peeled off and only the cholesteric liquid crystal layer is present.

<Support>

The support 30 supports the alignment film 32 and the cholesteric liquid crystal layer 18 (20).

As the support 30, various sheet-shaped materials (films or plate-shaped materials) can be used as long as they can support the alignment film 32 and the cholesteric liquid crystal layer 18 (20).

A transmittance of the support 30 with respect to corresponding light is preferably 50% or higher, more preferably 70% or higher, and still more preferably 85% or higher.

The thickness of the support 30 is not particularly limited and may be appropriately set depending on the use of the liquid crystal diffraction element, a material for forming the support 30, and the like in a range where the alignment film 32 and the cholesteric liquid crystal layer 18 (20) can be supported.

The thickness of the support 30 is preferably 1 to 1000 µm, more preferably 3 to 250 µm, and still more preferably 5 to 150 µm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

<Alignment Film>

In the liquid crystal diffraction element, the alignment film 32 is formed on a surface of the support 30.

The alignment film 32 is an alignment film for aligning the liquid crystal compound 40 to a predetermined liquid crystal alignment pattern during the formation of the cholesteric liquid crystal layer 18 (20).

Although described below, in the present invention, the cholesteric liquid crystal layer 18 (20) has a liquid crystal alignment pattern in which a direction of an optical axis 40A (refer to FIG. 3) derived from the liquid crystal compound 40 changes while continuously rotating in one in-plane direction. Accordingly, the alignment film 32 is formed such that the cholesteric liquid crystal layer 18 (20) can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or an alignment film 32 such as JP2005-97377A, JP2005-99228A, and JP2005-128503A is preferable.

In the cholesteric liquid crystal layer, for example, the alignment film 32 can be suitably used as a so-called photo-alignment film obtained by irradiating a photo-alignable material with polarized light or non-polarized light. That is, in the cholesteric liquid crystal layer, a photo-alignment film that is formed by applying a photo-alignable material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably 0.05 to 2 μm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 4:
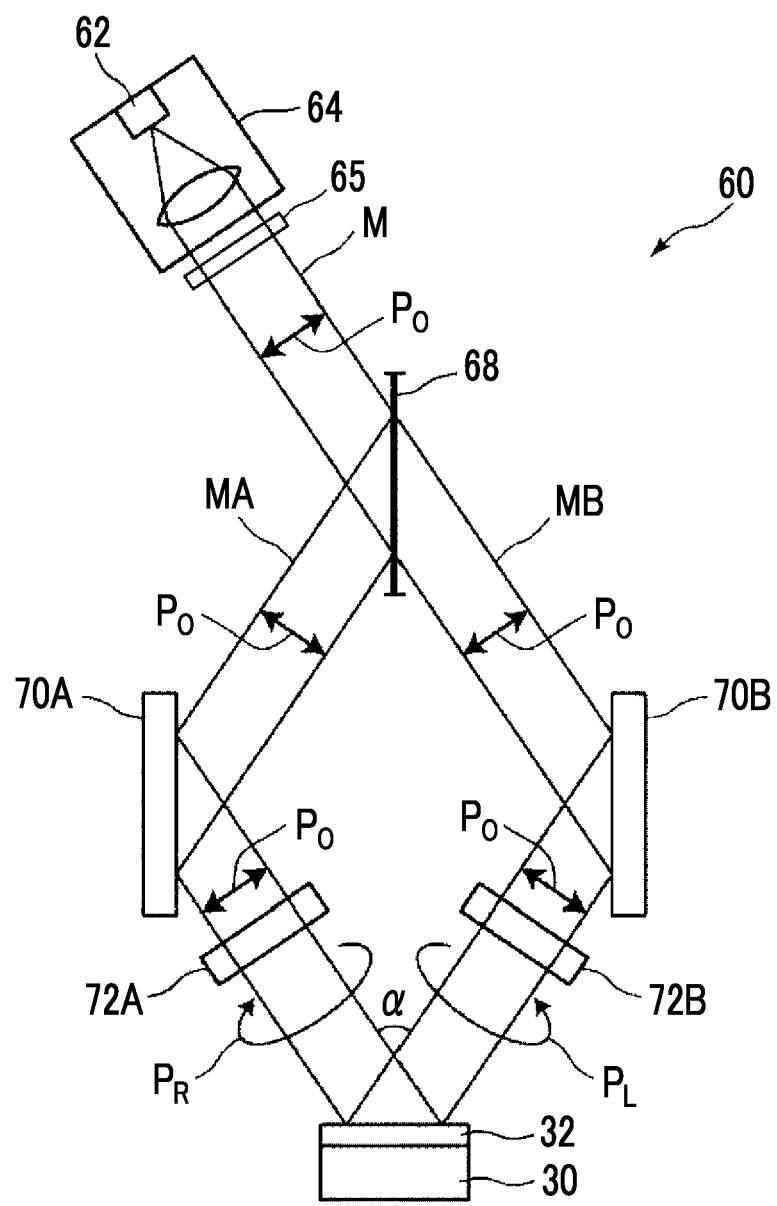
FIG. 4 is a conceptual diagram showing an example of an exposure device that exposes an alignment film of the cholesteric liquid crystal layer shown in FIG. 2.

FIG. 4 conceptually shows an example of an exposure device that exposes the alignment film 32 to form an alignment pattern.

An exposure device 60 shown in FIG. 4 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the splitted two beams MA and MB; and λ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the alignment film 32 on which the alignment pattern is not yet formed is disposed at an exposed portion, the two beams MA and MB intersect and interfere each other on the alignment film 32, and the alignment film 32 is irradiated with and exposed to the interference light.

Due to the interference in this case, the polarization state of light with which the alignment film 32 is irradiated periodically changes according to interference fringes. As a result, an alignment film (hereinafter, also referred to as "patterned alignment film") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the alignment film 32 having the alignment pattern in which the alignment state periodically changes, as described below, the cholesteric liquid crystal layer 18 (20) having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has an alignment pattern in which the liquid crystal compound is aligned such that the direction of the optical axis of the liquid crystal compound in the cholesteric liquid crystal layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, or the like, the cholesteric liquid crystal layer has the liquid crystal alignment pattern in which the direction of the optical axis 40A derived from the liquid crystal compound 40 changes while continuously rotating in at least one in-plane direction. That is, in the present invention, the support 30 can be made to function as the alignment film.

<Cholesteric Liquid Crystal Layer>

The cholesteric liquid crystal layer 18 (20) is formed on a surface of the alignment film 32.

As described above, the cholesteric liquid crystal layer 18 (20) is a cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction.

As conceptually shown in FIG. 2, the cholesteric liquid crystal layer 18 (20) has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically rotated once (rotated by 360°) and laminated is set as one helical pitch, and plural pitches of the helically turned liquid crystal compound 40 are laminated.

As is well-known, the cholesteric liquid crystal layer obtained by immobilizing a cholesteric liquid crystalline phase has Wavelength-selective reflectivity.

Although described below in detail, the selective reflection wavelength range of the cholesteric liquid crystal layer depends on the length (pitch P shown in FIG. 2) of one helical pitch described above in the thickness direction.

Accordingly, in the configuration where wavelength selectivity is imparted to the liquid crystal diffraction element to diffract only light having a predetermined wavelength, the selective reflection wavelength range of the cholesteric liquid crystal layer may be set by adjusting the helical pitch P of the cholesteric liquid crystal layer.

«Cholesteric Liquid Crystalline Phase»

It is known that the cholesteric liquid crystalline phase exhibits selective reflectivity at a specific wavelength.

A center wavelength of selective reflection (selective reflection center wavelength) $\lambda$ of a general cholesteric liquid crystalline phase depends on a helical pitch P in the cholesteric liquid crystalline phase and complies with a relationship of $\lambda = n \times P$ with an average refractive index n of the cholesteric liquid crystalline phase. Therefore, the selective reflection center wavelength can be adjusted by adjusting the helical pitch.

The selective reflection center wavelength of the cholesteric liquid crystalline phase increases as the pitch P increases.

As described above, the helical pitch P refers to one pitch (helical period) of the helical structure of the cholesteric liquid crystalline phase, in other words, one helical turn. That is, the helical pitch refers to the length in a helical axis direction in which a director (in the case of a rod-shaped liquid crystal, a major axis direction) of the liquid crystal compound constituting the cholesteric liquid crystalline phase rotates by 360°.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the pitch can be found in "Fuji Film Research & Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflectivity with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected.

A twisted direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection wavelength range (circularly polarized light reflection wavelength range) where selective reflection is exhibited depends on $\Delta n$ of the cholesteric liquid crystalline phase and the helical pitch P and complies with a relationship of $\Delta\lambda = \Delta n \times P$. Therefore, the width of the selective reflection wavelength range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the use of the diffraction element and may be, for example, 10 to 500 nm and is preferably 20 to 300 nm and more preferably 30 to 100 nm.

«Method of Forming Cholesteric Liquid Crystal Layer»

The cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 40 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

—Polymerizable Liquid Crystal Compound—

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586, WO95/24455, WO97/00600, WO98/23580, WO98/52905, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Shaped Liquid Crystal Compound—

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

—Surfactant—

The liquid crystal composition used for forming the cholesteric liquid crystal layer may include a surfactant.

It is preferable that the surfactant is a compound that can function as an alignment control agent contributing to the stable or rapid alignment of a cholesteric liquid crystalline phase. Examples of the surfactant include a silicone surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01 to 200 mol % and more preferably 1 to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367, 661A and 2,367,670A), an acyloin ether (described in U.S. Pat. No. 2,448,828A), an α-hydrocarbon-substituted aromatic acyloin compound (described in U.S. Pat. No. 2,722, 512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212, 970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth) acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3 to 20 mass % and more preferably 5 to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, in a case where the cholesteric liquid crystal layer is formed on the alignment film 32, it is preferable that the cholesteric liquid crystal layer obtained by immobilizing a cholesteric liquid crystalline phase is formed by applying the liquid crystal composition to the alignment film 32, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition may be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the cholesteric liquid crystal layer is not particularly limited, and the thickness with which a required light reflectivity can be obtained may be appropriately set depending on the use of the cholesteric liquid crystal layer, the light reflectivity required for the cholesteric liquid crystal layer, the material for forming the cholesteric liquid crystal layer, and the like.

«Liquid Crystal Alignment Pattern of Cholesteric Liquid Crystal Layer»

As described above, in the cholesteric liquid crystal layer, the cholesteric liquid crystal layer has the liquid crystal alignment pattern in which the direction of the optical axis 40A derived from the liquid crystal compound 40 forming the cholesteric liquid crystalline phase changes while continuously rotating in the one in-plane direction of the cholesteric liquid crystal layer.

The optical axis 40A derived from the liquid crystal compound 40 is an axis having the highest refractive index in the liquid crystal compound 40, that is, a so-called slow axis. For example, in a case where the liquid crystal compound 40 is a rod-shaped liquid crystal compound, the optical axis 40A is along a rod-shaped major axis direction. In the following description, the optical axis 40A derived from the liquid crystal compound 40 will also be referred to as "the optical axis 40A of the liquid crystal compound 40" or "the optical axis 40A".

FIG. 3 conceptually shows a plan view of the cholesteric liquid crystal layer 18 (20).

The plan view is a view in a case where the cholesteric liquid crystal layer is seen from the top in FIG. 2, that is, a view in a case where the cholesteric liquid crystal layer is seen from a thickness direction (laminating direction of the respective layers (films)).

In addition, in FIG. 3, in order to clarify the configuration of the cholesteric liquid crystal layer (cholesteric liquid crystal layer 18 (20)), only the liquid crystal compound 40 on the surface of the alignment film 32 is shown.

As shown in FIG. 3, on the surface of the alignment film 32, the liquid crystal compound 40 forming the cholesteric liquid crystal layer 18 (20) has the liquid crystal alignment pattern in which the direction of the optical axis 40A changes while continuously rotating in the predetermined one in-plane direction indicated by arrow X1 in a plane of the cholesteric liquid crystal layer according to the alignment pattern formed on the alignment film 32 as the lower layer. In the example shown in the drawing, the liquid crystal compound 40 has the liquid crystal alignment pattern in which the optical axis 40A of the liquid crystal compound 40 changes while continuously rotating clockwise in the arrow X1 direction.

The liquid crystal compound 40 forming the cholesteric liquid crystal layer 18 (20) is two-dimensionally arranged in a direction perpendicular to the arrow X1 and the one in-plane direction (arrow X1 direction).

In the following description, the direction perpendicular to the arrow X1 direction will be referred to as "Y direction" for convenience of description. That is, the arrow Y direction is a direction perpendicular to the one in-plane direction in which the direction of the optical axis 40A of the liquid crystal compound 40 changes while continuously rotating in a plane of the cholesteric liquid crystal layer. Accordingly, in FIGS. 2 and 5 described below, the Y direction is a direction perpendicular to the paper plane.

Specifically, "the direction of the optical axis 40A of the liquid crystal compound 40 changes while continuously rotating in the arrow X1 direction (the predetermined one in-plane direction)" represents that an angle between the optical axis 40A of the liquid crystal compound 40, which is arranged in the arrow X1 direction, and the arrow X1 direction varies depending on positions in the arrow X1 direction, and the angle between the optical axis 40A and the arrow X1 direction sequentially changes from θ to θ+180° or θ−180° in the arrow X1 direction.

A difference between the angles of the optical axes 40A of the liquid crystal compound 40 adjacent to each other in the arrow X1 direction is preferably 45° or less, more preferably 15° or less, and still more preferably less than 15°.

On the other hand, in the liquid crystal compound 40 forming the cholesteric liquid crystal layer 18 (20), the directions of the optical axes 40A are the same in the Y direction perpendicular to the arrow X1 direction, that is, the Y direction perpendicular to the one in-plane direction in which the optical axis 40A continuously rotates.

In other words, in the liquid crystal compound 40 forming the cholesteric liquid crystal layer 18 (20), angles between the optical axes 40A of the liquid crystal compound 40 and the arrow X1 direction are the same in the Y direction.

In the cholesteric liquid crystal layer 18 (20), in the liquid crystal alignment pattern of the liquid crystal compound 40, the length (distance) over which the optical axis 40A of the liquid crystal compound 40 rotates by 180° in the arrow X1 direction in which the optical axis 40A changes while continuously rotating in a plane is the length Λ of the single period in the liquid crystal alignment pattern.

That is, a distance between centers of two liquid crystal compounds 40 in the arrow X1 direction is the length Λ of the single period, the two liquid crystal compounds having the same angle in the arrow X1 direction. Specifically, as shown in FIG. 3, a distance of centers in the arrow X1 direction of two liquid crystal compounds 40 in which the arrow X1 direction and the direction of the optical axis 40A match each other is the length Λ of the single period. In the following description, the length Λ of the single period will also be referred to as "single period Λ".

In the liquid crystal alignment pattern of the cholesteric liquid crystal layer 18 (20), the single period Λ is repeated in the arrow X1 direction, that is, in the one in-plane direction in which the direction of the optical axis 40A changes while continuously rotating.

The cholesteric liquid crystal layer obtained by immobilizing a cholesteric liquid crystalline phase typically reflects incident light (circularly polarized light) by specular reflection.

On the other hand, the cholesteric liquid crystal layer 18 (20) reflects incidence light in a state where it is tilted in the arrow X1 direction with respect to the specular reflection. The cholesteric liquid crystal layer 18 (20) has the liquid crystal alignment pattern in which the optical axis 40A changes while continuously rotating in the arrow X1 direction in a plane (the predetermined one in-plane direction). Hereinafter, the description will be made with reference to FIG. 5.

For example, the cholesteric liquid crystal layer 18 (20) selectively reflects right circularly polarized light $R_R$ of red light. Accordingly, in a case where light is incident into the cholesteric liquid crystal layer 18 (20), the cholesteric liquid crystal layer 18 (20) reflects only right circularly polarized light $R_R$ of red light and allows transmission of the other light.

In a case where the right circularly polarized light $R_R$ of red light incident into the cholesteric liquid crystal layer 18 (20) is reflected from the cholesteric liquid crystal layer, the absolute phase changes depending on the directions of the optical axes 40A of the respective liquid crystal compounds 40.

Here, in the cholesteric liquid crystal layer 18 (20), the optical axis 40A of the liquid crystal compound 40 changes while rotating in the arrow X1 direction (the one in-plane direction). Therefore, the amount of change in the absolute phase of the incident right circularly polarized light $R_R$ of red light varies depending on the directions of the optical axes 40A.

Further, the liquid crystal alignment pattern formed in the cholesteric liquid crystal layer 18 (20) is a pattern that is periodic in the arrow X1 direction. Therefore, as conceptually shown in FIG. 5, an absolute phase Q that is periodic in the arrow X1 direction corresponding to the direction of the optical axis 40A is assigned to the right circularly polarized light $R_R$ of red light incident into the cholesteric liquid crystal layer 18 (20).

In addition, the direction of the optical axis 40A of the liquid crystal compound 40 with respect to the arrow X1 direction is uniform in the arrangement of the liquid crystal compound 40 in the Y direction perpendicular to arrow X1 direction.

As a result, in the cholesteric liquid crystal layer 18 (20), an equiphase surface E that is tilted in the arrow X1 direction with respect to an XY plane is formed for the right circularly polarized light $R_R$ of red light.

Therefore, the right circularly polarized light $R_R$ of red light is reflected in the normal direction of the equiphase surface E, and the reflected right circularly polarized light $R_R$ of red light is reflected in a direction that is tilted in the arrow X1 direction with respect to the XY plane (main surface of the cholesteric liquid crystal layer).

Accordingly, by appropriately setting the arrow X1 direction as the one in-plane direction in which the optical axis 40A rotates, a direction in which the right circularly polarized light $R_R$ of red light is reflected can be adjusted.

Figure 5:
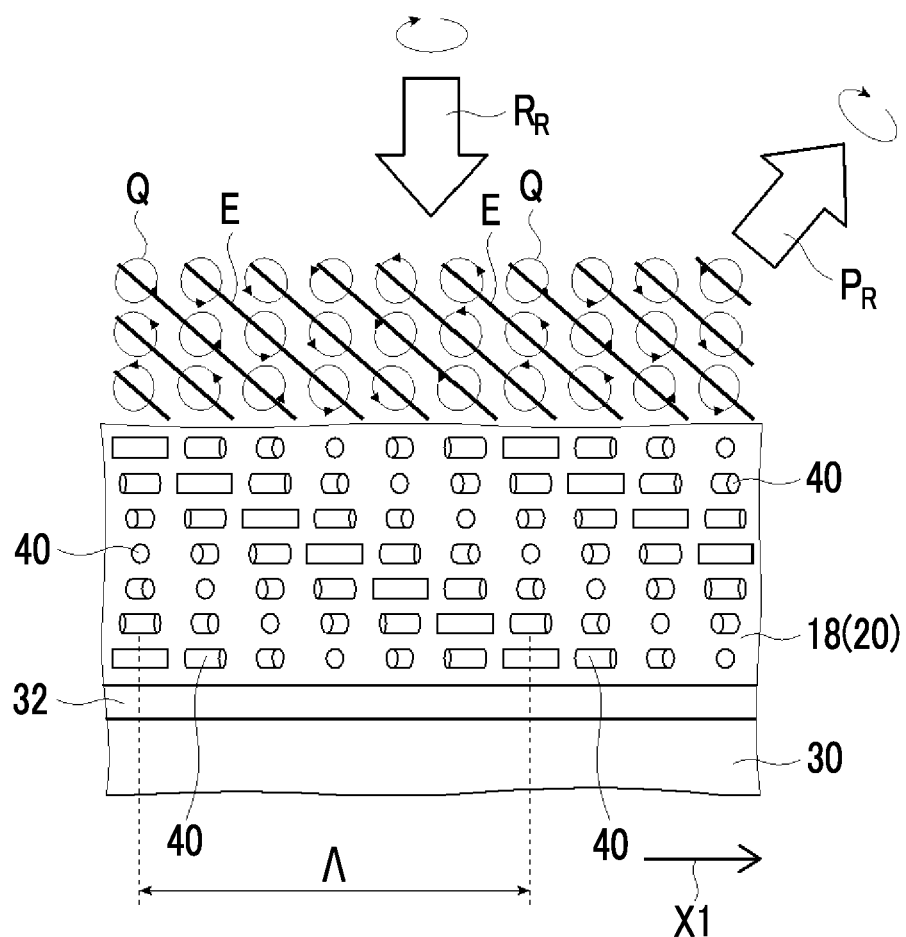
FIG. 5 is a conceptual diagram showing an action of the cholesteric liquid crystal layer shown in FIG. 2.

That is, by reversing the arrow X1 direction, the reflection direction of the right circularly polarized light $R_R$ of red light is opposite to that of FIG. 5.

In addition, by reversing the rotation direction of the optical axis 40A of the liquid crystal compound 40 toward the arrow X1 direction, a reflection direction of the right circularly polarized light $R_R$ of red light can be reversed.

That is, in FIGS. 3 and 5, the rotation direction of the optical axis 40A toward the arrow X1 direction is clockwise, and the right circularly polarized light $R_R$ of red light is reflected in a state where it is tilted in the arrow X1 direction. By setting the rotation direction of the optical axis 40A to be counterclockwise, the right circularly polarized light $R_R$ of red light is reflected in a state where it is tilted in a direction opposite to the arrow X1 direction.

Further, in the cholesteric liquid crystal layer having the same liquid crystal alignment pattern, the reflection direction is reversed by adjusting the helical turning direction of the liquid crystal compound 40, that is, the turning direction of circularly polarized light to be reflected.

The cholesteric liquid crystal layer 18 (20) shown in FIG. 5 has a right-twisted helical turning direction, selectively reflects right circularly polarized light, and has the liquid crystal alignment pattern in which the optical axis 40A rotates clockwise in the arrow X1 direction. As a result, the right circularly polarized light is reflected in a state where it is tilted in the arrow X1 direction.

Accordingly, in the cholesteric liquid crystal layer that has a left-twisted helical turning direction, selectively reflects left circularly polarized light, and has the liquid crystal alignment pattern in which the optical axis 40A rotates clockwise in the arrow X1 direction, the left circularly polarized light is reflected in a state where it is tilted in a direction opposite to the arrow X1 direction.

In the cholesteric liquid crystal layer having the liquid crystal alignment pattern, as the single period Λ decreases, the angle of reflected light with respect to the above-described incidence light increases. That is, as the single period Λ decreases, reflected light can be reflected in a state where it is largely tilted with respect to incidence light.

(Action of Liquid Crystal Diffraction Element)

As described above, the cholesteric liquid crystal layer having the liquid crystal alignment pattern has wavelength-selective reflectivity and reflects light having a selective wavelength while diffracting the light.

Here, in the configuration where the cholesteric liquid crystal layer has the liquid crystal alignment pattern, it can be seen that, in a case where reflected light is tilted and reflected, the reflected light in the cholesteric liquid crystal layer may be reflected multiple times in the cholesteric liquid crystal layer depending on the angle of the reflected light, a difference in refractive index between the cholesteric liquid crystal layer and a layer (for example, air layer) adjacent to the cholesteric liquid crystal layer, and the like, and the light may be emitted from a surface opposite to the light incidence surface and transmit through the cholesteric liquid crystal layer.

Specifically, a phenomenon that occurs is presumed to be as follows.

Figure 6:
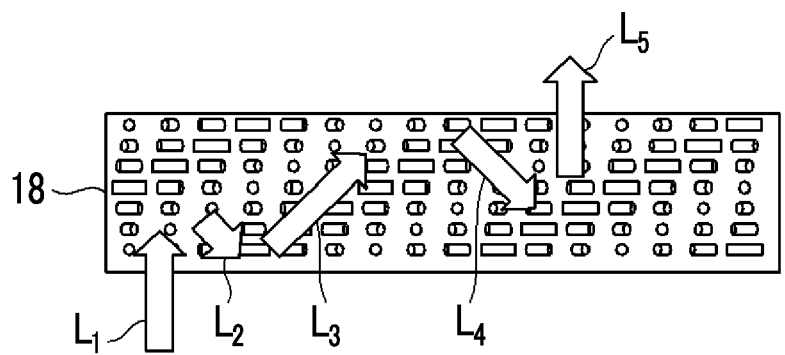
FIG. 6 is a conceptual diagram showing the action of the cholesteric liquid crystal layer.

As shown in FIG. 6, in a case where the cholesteric liquid crystal layer has a monolayer structure and light $L_1$ having a selective reflection wavelength is incident into the cholesteric liquid crystal layer 18 from a direction perpendicular to a main surface of the cholesteric liquid crystal layer 18, the light $L_1$ is reflected in a tilted direction by the above-described equiphase surface E (refer to FIG. 5) in the cholesteric liquid crystal layer 18 (light $L_2$). The reflected light $L_2$ arrives at an interface (surface on the side where the light $L_1$ is incident) of the cholesteric liquid crystal layer 18, but a traveling direction of the light $L_2$ is tilted with respect to the interface of the cholesteric liquid crystal layer 18. Therefore, the light $L_2$ is totally reflected depending on the angle of the reflected light, a difference in refractive index between the cholesteric liquid crystal layer 18 and a layer (for example, air layer) adjacent to the cholesteric liquid crystal layer 18, and the like (light $L_3$). The reflected light $L_3$ travels in the cholesteric liquid crystal layer 18, but a traveling direction thereof forms an angle substantially parallel to the equiphase surface E. Therefore, the light $L_3$ is not reflected in the cholesteric liquid crystal layer 18 and arrives at another interface (surface opposite to the surface where the light $L_1$ is incident) of the cholesteric liquid crystal layer 18. As in the light $L_2$, the traveling direction of the light $L_3$ is tilted with respect to the interface of the cholesteric liquid crystal layer 18, and thus the light $L_3$ is totally reflected from the interface (light $L_4$). The reflected light $L_4$ travels in the cholesteric liquid crystal layer 18, but a traveling direction thereof forms an angle substantially perpendicular to the above-described equiphase surface E. Therefore, the light $L_4$ is reflected from the equiphase surface E (light $L_5$). In this case, the angle of the traveling direction of the light $L_4$ with respect to the equiphase surface E is the same as the angle of the traveling direction of the light $L_2$ reflected from the equiphase surface E. Therefore, in a case where the light $L_4$ is reflected from the equiphase surface E, the traveling direction of the reflected light $L_5$ is the same as that of the light $L_1$. That is, in the example shown in FIG. 6, the light $L_5$ is emitted in a direction perpendicular to the main surface of the cholesteric liquid crystal layer 18. The equiphase surface is a periodic surface in which the liquid crystal compound is directed in the same alignment direction.

Hereinabove, in the cholesteric liquid crystal layer having the liquid crystal alignment pattern, the light may be emitted from a surface opposite to the light incidence surface and transmit through the cholesteric liquid crystal layer depending on the angle of the reflected light, a difference in refractive index between the cholesteric liquid crystal layer and a layer adjacent to the cholesteric liquid crystal layer, and the like. In this case, the incidence angle of incidence light and the emission angle of transmitted light are the same, and thus the effect of diffraction cannot be obtained.

On the other hand, the liquid crystal diffraction element according to the embodiment of the present invention has the configuration in which the above-described cholesteric liquid crystal layers are laminated and the single periods of the liquid crystal alignment patterns of the laminated cholesteric liquid crystal layers are different from each other. An action of the liquid crystal diffraction element having the above-described configuration will be described using FIG. 7.

Figure 7:
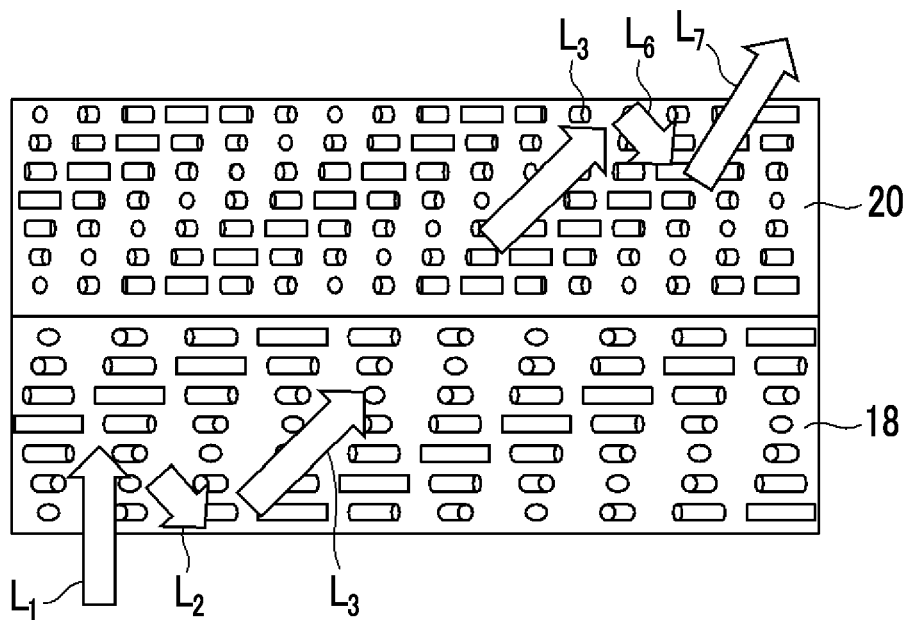
FIG. 7 is a diagram conceptually showing an action of the liquid crystal diffraction element shown in FIG. 1.

As shown in FIG. 7, in a case where the cholesteric liquid crystal layer has a two-layer structure and light $L_1$ having a selective reflection wavelength is incident into the first cholesteric liquid crystal layer 18 from a direction perpendicular to a main surface of the first cholesteric liquid crystal layer 18, the light $L_1$ is reflected in a tilted direction by the above-described equiphase surface E (refer to FIG. 5) in the first cholesteric liquid crystal layer 18 (light $L_2$). The reflected light $L_2$ arrives at an interface (surface on the side where the light $L_1$ is incident) of the first cholesteric liquid crystal layer 18, but a traveling direction of the light $L_2$ is tilted with respect to the interface of the first cholesteric liquid crystal layer 18. Therefore, the light $L_2$ is totally reflected depending on the angle of the reflected light, a difference in refractive index between the first cholesteric liquid crystal layer 18 and a layer (for example, air layer) adjacent to the first cholesteric liquid crystal layer 18, and the like (light $L_3$). The reflected light $L_3$ travels in the first cholesteric liquid crystal layer 18, but a traveling direction thereof intersects with the equiphase surface E at an angle substantially parallel to the equiphase surface E. Therefore, the light $L_3$ is not reflected in the first cholesteric liquid crystal layer 18 and arrives at another interface (surface on the second cholesteric liquid crystal layer 20 side) of the first cholesteric liquid crystal layer 18. Since the refractive indices of the first cholesteric liquid crystal layer 18 and the second cholesteric liquid crystal layer 20 are close to each other, the light $L_3$ is incident into the second cholesteric liquid crystal layer 20 without being reflected from an interface between the first cholesteric liquid crystal layer 18 and the second cholesteric liquid crystal layer 20. The reflected light $L_3$ incident into the second cholesteric liquid crystal layer 20 travels in the second cholesteric liquid crystal layer 20, but a traveling direction thereof intersects with the equiphase surface E at an angle substantially parallel to the equiphase surface E. Therefore, the light $L_3$ is not reflected in the second cholesteric liquid crystal layer 20 and arrives at another interface (surface opposite to the first cholesteric liquid crystal layer 18) of the second cholesteric liquid crystal layer 20. As in the light $L_2$, the traveling direction of the light $L_3$ is tilted with respect to the interface of the second cholesteric liquid crystal layer 20, and thus the light $L_3$ is totally reflected from the interface (light $L_6$). The reflected light $L_6$ travels in the second cholesteric liquid crystal layer 20, but a traveling direction thereof intersects with the equiphase surface E of the second cholesteric liquid crystal layer 20. Therefore, the light $L_6$ is reflected from the equiphase surface E (light $L_7$).

Here, the single period of the liquid crystal alignment pattern of the first cholesteric liquid crystal layer 18 and the single period of the liquid crystal alignment pattern of the second cholesteric liquid crystal layer 20 are different from each other. Therefore, the angles of the equiphase surface E of the first cholesteric liquid crystal layer 18 and the equiphase surface E of the second cholesteric liquid crystal layer 20 with respect to the main surface of the first cholesteric liquid crystal layer 18 (liquid crystal diffraction element) are different from each other. On the other hand, the angle of the traveling direction of the light $L_6$ is the same as the angle of the traveling direction of the light $L_2$ reflected from the equiphase surface E of the first cholesteric liquid crystal layer 18. Therefore, the angle of the traveling direction of the light $L_6$ with respect to the equiphase surface E of the second cholesteric liquid crystal layer 20 is different from the angle of the traveling direction of the light $L_2$ with respect to the equiphase surface E of the first cholesteric liquid crystal layer 18. Therefore, a traveling direction of the light $L_7$ reflected from the equiphase surface E of the second cholesteric liquid crystal layer 20 is different from that of the incidence light $L_1$. That is, in the example shown in FIG. 7, the light $L_7$ is emitted in a direction tilted with respect to a direction perpendicular to the main surface of the liquid crystal diffraction element.

This way, in the liquid crystal diffraction element according to the embodiment of the present invention having the configuration in which the cholesteric liquid crystal layers having the liquid crystal alignment pattern are laminated, light is emitted from a surface opposite to the surface where the light is incident, and the angle of the traveling direction of the emitted light can be made to be different from that of the traveling direction of the incidence light.

Here, as described above, the first cholesteric liquid crystal layer 18 and the second cholesteric liquid crystal layer 20 have wavelength-selective reflectivity, and the selective reflection wavelength of the first cholesteric liquid crystal layer 18 and the selective reflection wavelength of the second cholesteric liquid crystal layer 20 are the same.

Therefore, in the liquid crystal diffraction element, light having the selective reflection wavelengths of the first cholesteric liquid crystal layer 18 and the second cholesteric liquid crystal layer 20 in incident light is diffracted and transmits therethrough.

On the other hand, in a case where the wavelength of incident light is different from the selective reflection wavelength, the light is not reflected from the first cholesteric liquid crystal layer 18 and the second cholesteric liquid crystal layer 20. Therefore, the light transmits through the liquid crystal diffraction element without being diffracted.

In addition, in a case where the selective reflection wavelength of the first cholesteric liquid crystal layer 18 and the selective reflection wavelength of the second cholesteric liquid crystal layer 20 are different from each other, for example, in a case where light having the selective reflection wavelength of the first cholesteric liquid crystal layer 18 is incident, the light is reflected in the first cholesteric liquid crystal layer 18 as in the example shown in FIG. 7 to be incident into the second cholesteric liquid crystal layer 20. However, the light is not reflected from the equiphase surface E of the second cholesteric liquid crystal layer 20, and the light $L_6$ reflected from the interface of the second cholesteric liquid crystal layer 20 returns to the first cholesteric liquid crystal layer 18, is reflected from the equiphase surface E of the first cholesteric liquid crystal layer 18, and is incident into the second cholesteric liquid crystal layer 20 again. In this case, as in the case where the cholesteric liquid crystal layer shown in FIG. 6 has the monolayer structure, the light reflected from the equiphase surface E of the first cholesteric liquid crystal layer 18 has the same incidence angle as that of the incidence light $L_1$. Therefore, the light is incident into the second cholesteric liquid crystal layer 20 and is emitted from the surface opposite to the first cholesteric liquid crystal layer 18 in the vertical direction. Accordingly, the incident light transmits through the liquid crystal diffraction element without being diffracted.

As described above, the liquid crystal diffraction element according to the embodiment of the present invention in which the first cholesteric liquid crystal layer 18 and the second cholesteric liquid crystal layer 20 are laminated is a transmission type diffraction element and can realize a diffraction element having wavelength selectivity.

In the example shown in FIG. 7, a twisted direction of a helical structure of the first cholesteric liquid crystal layer 18 and a twisted direction of a helical structure of the second cholesteric liquid crystal layer 20 are the same. That is, a turning direction of circularly polarized light to be reflected from the first cholesteric liquid crystal layer 18 and a turning direction of circularly polarized light to be reflected from the second cholesteric liquid crystal layer 20 are the same. As a result, circularly polarized light having the same turning direction can be reflected from the equiphase surface E of the first cholesteric liquid crystal layer 18 and the equiphase surface E of the second cholesteric liquid crystal layer 20. Therefore, the action described in FIG. 7 can be exhibited.

Here, it is preferable that the single period of the liquid crystal alignment pattern of the first cholesteric liquid crystal layer 18 is less than the selective reflection wavelength of the first cholesteric liquid crystal layer 18, and the single period of the liquid crystal alignment pattern of the second cholesteric liquid crystal layer 20 is less than the selective reflection wavelength of the second cholesteric liquid crystal layer 20. With this configuration, light reflected from the equiphase surface E of the cholesteric liquid crystal layer can be reflected from an interface between the cholesteric liquid crystal layer and a layer (for example, an air layer) adjacent to the cholesteric liquid crystal layer.

In addition, it is preferable that the one in-plane direction (X1 direction in FIG. 3) in the liquid crystal alignment pattern of the first cholesteric liquid crystal layer 18 matches the one in-plane direction in the liquid crystal alignment pattern of the second cholesteric liquid crystal layer 20. With this configuration, diffraction by the liquid crystal diffraction element can be suitably exhibited.

Even in a case where the one in-plane direction in the liquid crystal alignment pattern of the first cholesteric liquid crystal layer 18 is different from the one in-plane direction in the liquid crystal alignment pattern of the second cholesteric liquid crystal layer 20, as long as the orientation directions of the angles of the equiphase surfaces substantially match each other, diffraction can be exhibited. In addition, in a case where a helical turning direction of the first cholesteric liquid crystal layer 18 and a helical turning direction of the second cholesteric liquid crystal layer 20 are different from each other, for example, in a case where there is a retardation between the first cholesteric liquid crystal layer 18 and the second cholesteric liquid crystal layer 20, diffraction may be exhibited even in a case where the one in-plane direction in the liquid crystal alignment pattern of the first cholesteric liquid crystal layer 18 is different from the one in-plane direction in the liquid crystal alignment pattern of the second cholesteric liquid crystal layer 20.

In a case where the length of the single period of the liquid crystal alignment pattern of the first cholesteric liquid crystal layer 18 is represented by $\Lambda_1$ and the length of the single period of the liquid crystal alignment pattern of the second cholesteric liquid crystal layer 20 is represented by $\Lambda_2$, $\Lambda_1$ and $\Lambda_2$ may be appropriately set depending on the desired diffraction angle, the selective reflection wavelength, and the like. A ratio between $\Lambda_1$ and $\Lambda_2$ is substantially 0.2 to 5.

In addition, the liquid crystal diffraction element is not limited to the configuration including only the first cholesteric liquid crystal layer 18 and the second cholesteric liquid crystal layer 20. As described above, the first cholesteric liquid crystal layer 18 and/or the second cholesteric liquid crystal layer 20 of the liquid crystal diffraction element may be in a state where they are laminated together with the support 30 and the alignment film 32 or may be in a state where they are laminated together with the alignment film 32.

In addition, the liquid crystal diffraction element may include another layer. For example, as in the example shown in FIG. 8, a light guide member 16 may be provided between the first cholesteric liquid crystal layer 18 and the second cholesteric liquid crystal layer 20. The light guide member 16 may also function as a support member that supports the cholesteric liquid crystal layer. In addition, as described below, with the configuration (λ/2 plate) in which the light guide member 16 has a retardation, the turning direction of circularly polarized light passing through the light guide member 16 can be changed.

Even in a case where the light guide member 16 is provided between the first cholesteric liquid crystal layer 18 and the second cholesteric liquid crystal layer 20, when light travels between the first cholesteric liquid crystal layer 18 and the second cholesteric liquid crystal layer 20, the light only passes through the inside of the light guide member 16 without affecting diffraction. Therefore, the same action of diffraction as that of the example shown in FIG. 7 can be obtained.

In addition, the present invention is not limited to the configuration in which the light guide member 16 is disposed between the first cholesteric liquid crystal layer 18 and the second cholesteric liquid crystal layer 20. As in the example shown in FIG. 9, the light guide member 16 may be disposed on the surface on the second cholesteric liquid crystal layer 20 side. Alternatively, as in the example shown in FIG. 10, the light guide member 16 may be disposed on the surface on the first cholesteric liquid crystal layer 18 side. Even in this configuration, the same action of diffraction as that of FIG. 7 can be obtained.

In addition, in the example shown in FIG. 7, the twisted direction of the helical structure of the first cholesteric liquid crystal layer 18 and the twisted direction of the helical structure of the second cholesteric liquid crystal layer 20 are the same, but the present invention is not limited thereto. For example, the twisted direction of the helical structure of the first cholesteric liquid crystal layer 18 and the twisted direction of the helical structure of the second cholesteric liquid crystal layer 20 are opposite to each other, and a λ/2 plate is disposed between the first cholesteric liquid crystal layer 18 and the second cholesteric liquid crystal layer 20. With the configuration in which the λ/2 plate is disposed between the first cholesteric liquid crystal layer 18 and the second cholesteric liquid crystal layer 20, when light travels from the first cholesteric liquid crystal layer 18 to the second cholesteric liquid crystal layer 20 through the λ/2 plate, a polarization direction of the light may be changed to an opposite direction. For example, in a case where light reflected from the equiphase surface E of the first cholesteric liquid crystal layer 18 is right circularly polarized light, light incident into the second cholesteric liquid crystal layer 20 through the λ/2 plate is left circularly polarized light. The twisted direction of the helical structure of the second cholesteric liquid crystal layer 20 is opposite to the twisted direction of the helical structure of the first cholesteric liquid crystal layer 18. Therefore, the light of which the polarization direction is changed into an opposite direction through the λ/2 plate can be reflected from the equiphase surface E. Accordingly, even in this configuration, the same action of diffraction as that of FIG. 7 can be obtained.

Here, the cholesteric liquid crystal layer 18 (20) shown in FIG. 2 has the configuration in which the optical axis of the liquid crystal compound is parallel to the main surface of the cholesteric liquid crystal layer, but the present invention is not limited thereto.

Figure 11:
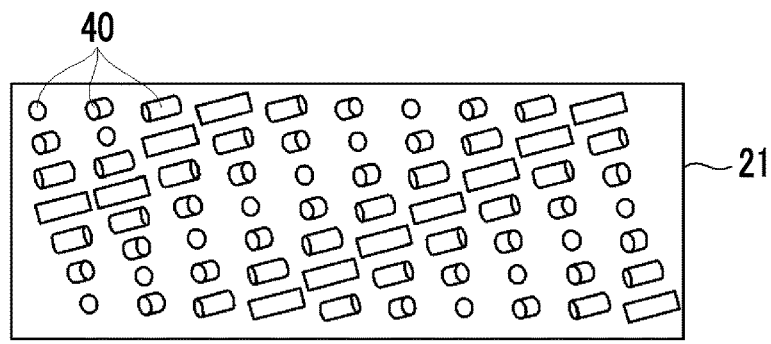
FIG. 11 is a diagram conceptually showing another example of the cholesteric liquid crystal layer.

For example, as in a cholesteric liquid crystal layer 21 shown in FIG. 11, in the above-described cholesteric liquid crystal layer, the optical axis of the liquid crystal compound may be tilted to the main surface of the liquid crystal layer (cholesteric liquid crystal layer). The cholesteric liquid crystal layer 21 are the same as the cholesteric liquid crystal layer 18 (20) in that they have the liquid crystal alignment pattern in which the direction of the optical axis derived from the liquid crystal compound changes while continuously rotating in the one in-plane direction. That is, the plan view of the cholesteric liquid crystal layer 21 is the same as that of FIG. 3.

In the following description, the configuration in which the optical axis of the liquid crystal compound is tilted with respect to the main surface of the cholesteric liquid crystal layer also has a pretilt angle.

The cholesteric liquid crystal layer may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

In a case where the cholesteric liquid crystal layer has the pretilt angle on the surface, the liquid crystal layer further has a tilt angle due to the influence of the surface even in a bulk portion distant from the surface. The liquid crystal compound has the pretilt angle (is tilted). As a result, in a case where light is diffracted, the effective birefringence index of the liquid crystal compound increases, and the diffraction efficiency can be improved.

The pretilt angle can be measured by cutting the liquid crystal layer with a microtome and observing a cross-section with a polarization microscope.

In the present invention, light that is vertically incident into the cholesteric liquid crystal layer travels obliquely in an oblique direction in the cholesteric liquid crystal layer along with a bending force. In a case where light travels in the cholesteric liquid crystal layer, diffraction loss is generated due to a deviation from conditions such as a diffraction period that are set to obtain a desired diffraction angle with respect to the vertically incident light.

In a case where the liquid crystal compound is tilted, an orientation in which a higher birefringence index is generated than that in an orientation in which light is diffracted as compared to a case where the liquid crystal compound is not tilted is present. In this direction, the effective extraordinary light refractive index increases, and thus the birefringence index as a difference between the extraordinary light refractive index and the ordinary light refractive index increases.

By setting the orientation of the pretilt angle according to the desired diffraction orientation, a deviation from the original diffraction conditions in the orientation can be suppressed. As a result, it is presumed that, in a case where the liquid crystal compound having a pretilt angle is used, a higher diffraction efficiency can be obtained.

The pretilt angle is in a range of 0 degrees to 90 degrees. However, in a case where the pretilt angle is excessively large, the birefringence index on the front decreases. Therefore, the pretilt angle is desirably about 1 degree to 30 degrees. The pretilt angle is more preferably 3 degrees to 20 degrees and still more preferably 5 degrees to 15 degrees.

In addition, it is desirable that the pretilt angle is controlled by treating the interface of the liquid crystal layer. By pretilting the alignment film on the support side interface, the pretilt angle of the liquid crystal compound can be controlled. For example, by exposing the alignment film to ultraviolet light from the front and subsequently obliquely exposing the alignment film during the formation of the alignment film, the liquid crystal compound in the cholesteric liquid crystal layer formed on the alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present. This configuration is suitable for improving the diffraction efficiency because it contributes to the most improvement of birefringence in the desired direction in a case where light is diffracted in the direction.

Further, an additive for promoting the pretilt angle can also be added to the cholesteric liquid crystal layer or to the alignment film. In this case, the additive can be used as a factor for further improving the diffraction efficiency.

This additive can also be used for controlling the pretilt angle on the air side interface.

In addition, the cholesteric liquid crystal layer in the liquid crystal diffraction element according to the embodiment of the present invention may be configured to have regions in which different lengths of the single periods in the liquid crystal alignment pattern are different in a plane.

Here, as described above, in the cholesteric liquid crystal layer having the liquid crystal alignment pattern, the reflection angle of light from the equiphase surface E of the cholesteric liquid crystal layer varies depending on the length Λ of the single period of the liquid crystal alignment pattern over which the optical axis 40A rotates by 180°. Specifically, as the length of the single period Λ decreases, the angle of reflected light with respect to incidence light increases. Accordingly, with the configuration in which the cholesteric liquid crystal layer has regions in which lengths of the single periods in the liquid crystal alignment pattern are different in a plane, the liquid crystal diffraction element can diffract light at different diffraction angles depending on the in-plane regions.

In this configuration, either or both of the first cholesteric liquid crystal layer 18 and the second cholesteric liquid crystal layer 20 have regions in which lengths of the single period of the liquid crystal alignment pattern are different in a plane. In this case, in each of the regions, the single period of the liquid crystal alignment pattern of the first cholesteric liquid crystal layer 18 and the single period of the liquid crystal alignment pattern of the second cholesteric liquid crystal layer 20 may be different from each other. In addition, the single period of the liquid crystal alignment pattern of the first cholesteric liquid crystal layer 18 and the single period of the liquid crystal alignment pattern of the second cholesteric liquid crystal layer 20 only need to be different from each other in at least a part of the region, and there may be a region where the single period of the liquid crystal alignment pattern of the first cholesteric liquid crystal layer 18 and the single period of the liquid crystal alignment pattern of the second cholesteric liquid crystal layer 20 are the same.

The optical axis 40A of the liquid crystal compound 40 in the liquid crystal alignment pattern of the cholesteric liquid crystal layer shown in FIG. 3 continuously rotates only in the arrow X1 direction.

However, the present invention is not limited thereto, and various configurations can be used as long as the optical axis 40A of the liquid crystal compound 40 in the cholesteric liquid crystal layer continuously rotates in the one in-plane direction.

Figure 12:
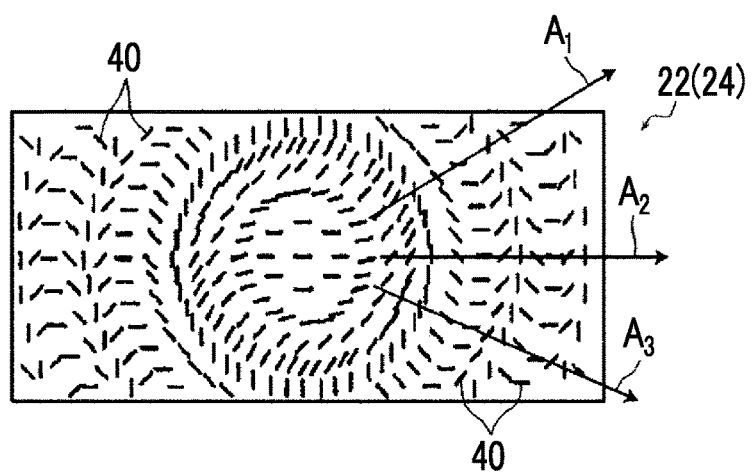
FIG. 12 is a front view conceptually showing another example of the cholesteric liquid crystal layer.

For example, a cholesteric liquid crystal layer 22 (24) conceptually shown in a plan view of FIG. 12 can be used, in which a liquid crystal alignment pattern is a concentric circular pattern having a concentric circular shape where the one in-plane direction in which the direction of the optical axis of the liquid crystal compound 40 changes while continuously rotating moves from an inside toward an outside.

Alternatively, a liquid crystal alignment pattern can also be used where the one in-plane direction in which the direction of the optical axis of the liquid crystal compound 40 changes while continuously rotating is provided in a radial shape from the center of the cholesteric liquid crystal layer 22 (24) instead of a concentric circular shape.

FIG. 12 shows only the liquid crystal compound 40 of the surface of the alignment film as in FIG. 3. However, as in the example shown in FIG. 2, the patterned cholesteric liquid crystal layer 22 (24) has the helical structure in which the liquid crystal compound 40 on the surface of the alignment film is helically turned and laminated as described above.

Figure 13:
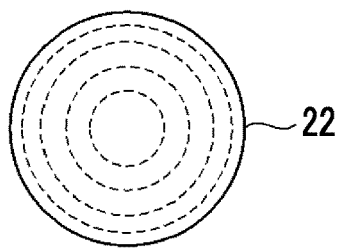
FIG. 13 is a diagram conceptually showing still another example of the liquid crystal diffraction element according to the present invention.
Figure 13:
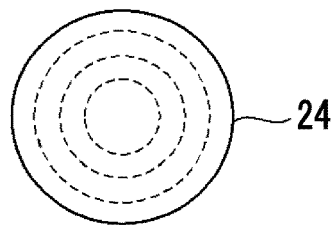

In addition, in the liquid crystal diffraction element, as shown in FIG. 13, each of a first cholesteric liquid crystal layer 22 and a second cholesteric liquid crystal layer 24 is the cholesteric liquid crystal layer having the concentric circular liquid crystal alignment pattern. In FIG. 13, an interval between the single periods of the liquid crystal alignment pattern of each of the cholesteric liquid crystal layers is indicated by a broken line. In addition, in FIG. 13, for convenience of description, the plan view of the first cholesteric liquid crystal layer 22 and the plan view of the second cholesteric liquid crystal layer 24 are separately disposed in the vertical direction.

As shown in FIG. 13, the single period of the liquid crystal alignment pattern of the first cholesteric liquid crystal layer 22 and the single period of the liquid crystal alignment pattern of the second cholesteric liquid crystal layer 24 are different from each other.

In the cholesteric liquid crystal layer 22 (24) shown in FIG. 12, the optical axis (not shown) of the liquid crystal compound 40 is a longitudinal direction of the liquid crystal compound 40.

In the cholesteric liquid crystal layer 22 (24), the direction of the optical axis of the liquid crystal compound 40 changes while continuously rotating in a direction in which a large number of optical axes move to the outside from the center of the cholesteric liquid crystal layer 22 (24), for example, a direction indicated by an arrow $Λ_1$, a direction indicated by an arrow $Λ_2$, a direction indicated by an arrow $Λ_3$, or . . . .

In addition, as a preferable aspect, for example, the direction of the optical axis of the liquid crystal compound changes while rotating in a radial direction from the center of the cholesteric liquid crystal layer 22 (24) as shown in FIG. 12. In the aspect shown in FIG. 12, counterclockwise alignment is shown. The rotation directions of the optical axes indicated by the respective arrows $Λ_1$, $Λ_2$, and $Λ_3$ in FIG. 12 are counterclockwise toward the outside from the center.

This way, in the cholesteric liquid crystal layer 22 (24) having the concentric circular liquid crystal alignment pattern, that is, the liquid crystal alignment pattern in which the optical axis changes while continuously rotating in a radial shape, incidence light can be reflected as diverging light or converging light depending on the rotation direction of the optical axis of the liquid crystal compound 40 and the direction of circularly polarized light to be reflected.

That is, by setting the liquid crystal alignment pattern of the cholesteric liquid crystal layer in a concentric circular shape, the liquid crystal diffraction element according to the embodiment of the present invention exhibits, for example, a function as a concave lens or a convex lens.

Here, in a case where the liquid crystal alignment pattern of the cholesteric liquid crystal layer is concentric circular such that the liquid crystal diffraction element functions as a convex lens, it is preferable that the length of the single period Λ over which the optical axis rotates by 180° in the liquid crystal alignment pattern gradually decreases from the center of the cholesteric liquid crystal layer toward the outer direction in the one in-plane direction in which the optical axis continuously rotates.

As described above, the reflection angle of light with respect to an incidence direction increases as the length of the single period Λ in the liquid crystal alignment pattern decreases. Accordingly, the length of the single period Λ in the liquid crystal alignment pattern gradually decreases from the center of the cholesteric liquid crystal layer toward the outer direction in the one in-plane direction in which the optical axis continuously rotates. As a result, light can be further collected, and the performance as a convex lens can be improved.

In the present invention, in a case where the liquid crystal diffraction element functions as a concave lens, it is preferable that the continuous rotation direction of the optical axis in the liquid crystal alignment pattern is in a direction opposite to that of the case of the above-described convex lens from the center of the cholesteric liquid crystal layer 22 (24).

In addition, by gradually decreasing the length of the single period Λ over which the optical axis rotates by 180° from the center of the cholesteric liquid crystal layer 22 (24) toward the outer direction in the one in-plane direction in which the optical axis continuously rotates, light incident into the cholesteric liquid crystal layer can be further dispersed, and the performance as a concave lens can be improved.

In the present invention, in a case where the liquid crystal diffraction element functions as a concave lens, it is preferable that a direction of circularly polarized light to be reflected (sense of a helical structure) from the cholesteric liquid crystal layer is reversed to be opposite to that in the case of a convex lens, that is, the helical turning direction of the cholesteric liquid crystal layer is reversed.

In this case, by gradually decreasing the length of the single period Λ over which the optical axis rotates by 180° from the center of the cholesteric liquid crystal layer 22 (24) toward the outer direction in the one in-plane direction in which the optical axis continuously rotates, light reflected from the cholesteric liquid crystal layer can be further dispersed, and the performance as a concave lens can be improved.

In a state where the helical turning direction of the cholesteric liquid crystal layer is reversed, it is preferable that the continuous rotation direction of the optical axis in the liquid crystal alignment pattern is reversed from the center of the cholesteric liquid crystal layer. As a result, the liquid crystal diffraction element can be made to function as a convex lens.

In the present invention, in a case where the liquid crystal diffraction element is made to function as a convex lens or a concave lens, it is preferable that the optical element satisfies the following expression.

$$\Phi(r)=(\pi/\lambda)[(r^2+f^2)^{1/2}-f]$$

Here, r represents a distance from the center of a concentric circle and is represented by Expression "$r=(x^2+y^2)^{1/2}$". x and y represent in-plane positions, and $(x,y)=(0,0)$ represents the center of the concentric circle. $\Phi(r)$ represents an angle of the optical axis at the distance r from the center, λ represents the selective reflection center wavelength of the cholesteric liquid crystal layer, and f represents a desired focal length.

In the present invention, depending on the uses of the liquid crystal diffraction element, conversely, the length of the single period Λ in the concentric circular liquid crystal alignment pattern may gradually increase from the center of the cholesteric liquid crystal layer toward the outer direction in the one in-plane direction in which the optical axis continuously rotates.

Further, depending on the uses of the liquid crystal diffraction element such as a case where it is desired to provide a light amount distribution in transmitted light, a configuration in which regions having partially different lengths of the single periods Λ in the one in-plane direction in which the optical axis continuously rotates are provided can also be used instead of the configuration in which the length of the single period Λ gradually changes in the one in-plane direction in which the optical axis continuously rotates.

In addition, the liquid crystal diffraction element according to the embodiment of the present invention may include: one cholesteric liquid crystal layer in which the single period Λ is uniform over the entire surface; and another cholesteric liquid crystal layer that has regions in which lengths of the single periods Λ are different. Regarding this point, the same can also be applied to the configuration shown in FIG. 1 in which the optical axis continuously rotates only in the one in-plane direction.

Figure 14:
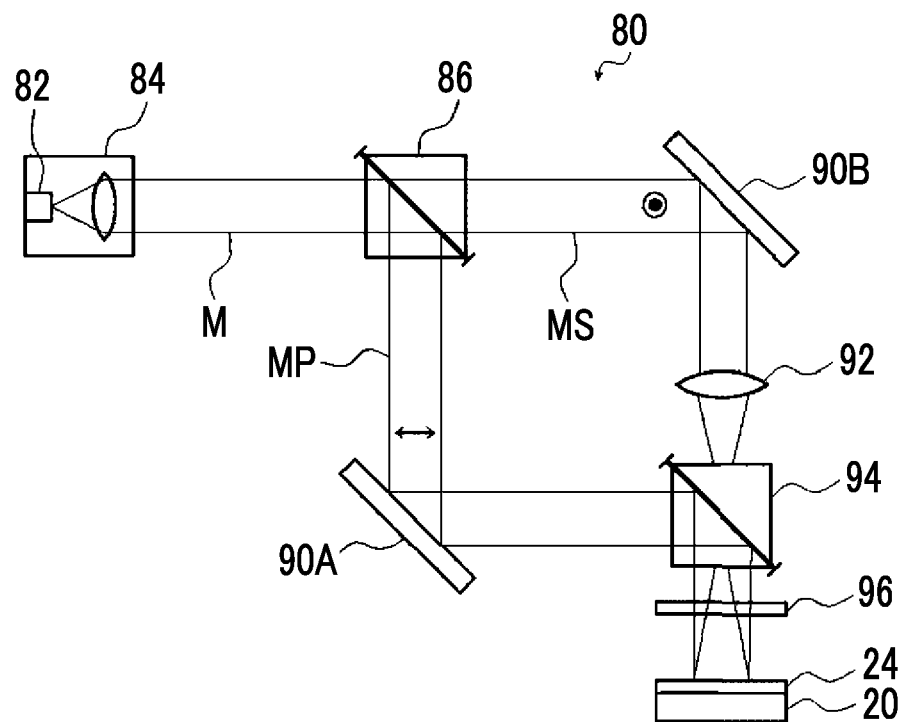
FIG. 14 is a diagram conceptually showing an example of an exposure device that exposes an alignment film on which the cholesteric liquid crystal layer shown in FIG. 12 is to be formed.

FIG. 14 conceptually shows an example of an exposure device that forms the concentric circular alignment pattern in the alignment film.

An exposure device 80 includes: a light source 84 that includes a laser 82; a polarization beam splitter 86 that splits the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is collected by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the alignment film 32 on the support 30.

Here, due to interference between the right circularly polarized light and the left circularly polarized light, the polarization state of light with which the alignment film 32 is irradiated periodically changes according to interference fringes. The intersecting angle between the right circularly polarized light and the left circularly polarized light changes from the inside to the outside of the concentric circle. Therefore, an exposure pattern in which the pitch changes from the inside to the outside can be obtained. As a result, in the alignment film 32, a concentric circular alignment pattern in which the alignment state periodically changes can be obtained.

In the exposure device 80, the length Λ of the single period in the liquid crystal alignment pattern in which the optical axis of the liquid crystal compound 40 continuously rotates by 180° can be controlled by changing the refractive power of the lens 92 (the F number of the lens 92), the focal length of the lens 92, the distance between the lens 92 and the alignment film 32, and the like.

In addition, by adjusting the refractive power of the lens 92 (the F number of the lens 92), the length Λ of the single period in the liquid crystal alignment pattern in the one in-plane direction in which the optical axis continuously rotates can be changed. Specifically, In addition, the length Λ of the single period in the liquid crystal alignment pattern in the one in-plane direction in which the optical axis continuously rotates can be changed depending on a light spread angle at which light is spread by the lens 92 due to interference with parallel light. More specifically, in a case where the refractive power of the lens 92 is weak, light is approximated to parallel light. Therefore, the length Λ of the single period in the liquid crystal alignment pattern gradually decreases from the inside toward the outside, and the F number increases. Conversely, in a case where the refractive power of the lens 92 becomes stronger, the length Λ of the single period in the liquid crystal alignment pattern rapidly decreases from the inside toward the outside, and the F number decreases.

This way, the configuration of changing the length of the single period Λ over which the optical axis rotates by 180° in the one in-plane direction in which the optical axis continuously rotates can also be used in the configuration shown in FIGS. 2 and 3 in which the optical axis 40A of the liquid crystal compound 40 changes while continuously rotating only in the one in-plane direction as the arrow X direction.

For example, by gradually decreasing the single period Λ of the liquid crystal alignment pattern in the arrow X direction, a liquid crystal diffraction element that reflects light to be collected can be obtained.

In addition, by reversing the direction in which the optical axis in the liquid crystal alignment pattern rotates by 180°, a liquid crystal diffraction element that reflects light to be diffused only in the arrow X direction can be obtained. Likewise, by reversing the direction of circularly polarized light to be reflected (sense of a helical structure) from the cholesteric liquid crystal layer, a liquid crystal diffraction element that reflects light to be diffused only in the arrow X direction can be obtained. By reversing the direction (the sense of the helical structure) in which the optical axis of the liquid crystal alignment pattern rotates by 180° in a state where the direction of circularly polarized light to be reflected from the cholesteric liquid crystal layer, a liquid crystal diffraction element that allows transmission of light to collect the light can be obtained.

Further, depending on the uses of the liquid crystal diffraction element such as a case where it is desired to provide a light amount distribution in diffracted light, a configuration in which regions having partially different lengths of the single periods Λ in the arrow X direction are provided can also be used instead of the configuration in which the length of the single period Λ gradually changes in the arrow X direction. For example, as a method of partially changing the single period Λ, for example, a method of scanning and exposing the photo-alignment film to be patterned while freely changing a polarization direction of laser light to be collected can be used.

[Laminated Diffraction Element]

The laminated diffraction element according to the embodiment of the present invention includes two or more of the above-described liquid crystal diffraction elements, in which selective reflection wavelengths of the liquid crystal diffraction elements are different from each other.

That is, the laminated diffraction element includes four or more cholesteric liquid crystal layers having a liquid crystal alignment pattern, in which the number of sets of cholesteric liquid crystal layers in which the selective reflection wavelengths are the same and the lengths of the single periods of the liquid crystal alignment patterns are different from each other is two or more.

Figure 15:
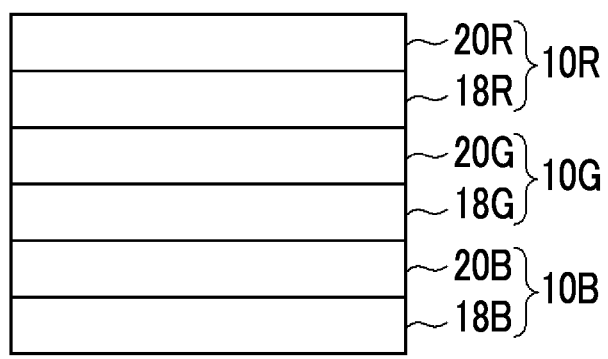
FIG. 15 is a diagram conceptually showing an example of a laminated liquid crystal diffraction element according to the present invention.

For example, a laminated liquid crystal diffraction element 50 shown in FIG. 15 includes: a liquid crystal diffraction element 10B in which the selective reflection wavelength is blue (B); a liquid crystal diffraction element 10G in which the selective reflection wavelength is green (G); and a liquid crystal diffraction element 10R in which the selective reflection wavelength is red (R).

The liquid crystal diffraction element 10B includes a first cholesteric liquid crystal layer 18B and a second cholesteric liquid crystal layer 20B. The liquid crystal diffraction element 10G includes a first cholesteric liquid crystal layer 18G and a second cholesteric liquid crystal layer 20G. The liquid crystal diffraction element 10R includes a first cholesteric liquid crystal layer 18R and a second cholesteric liquid crystal layer 20R.

All of the first cholesteric liquid crystal layer 18B, the second cholesteric liquid crystal layer 20B, the first cholesteric liquid crystal layer 18G, the second cholesteric liquid crystal layer 20G, the first cholesteric liquid crystal layer 18R, and the second cholesteric liquid crystal layer 20R are the cholesteric liquid crystal layers having the liquid crystal alignment pattern.

The first cholesteric liquid crystal layer 18B and the second cholesteric liquid crystal layer 20B have a selective reflection wavelength in a blue range. In addition, the single period of the liquid crystal alignment pattern of the first cholesteric liquid crystal layer 18B and the single period of the liquid crystal alignment pattern of the second cholesteric liquid crystal layer 20B are different from each other.

The liquid crystal diffraction element 10B including the first cholesteric liquid crystal layer 18B and the second cholesteric liquid crystal layer 20B selectively allows transmission of blue light and diffracts the blue light. In addition, the liquid crystal diffraction element 10B does not function on green light and red light and thus allows transmission of green light and red light.

The first cholesteric liquid crystal layer 18G and the second cholesteric liquid crystal layer 20G have a selective reflection wavelength in a green range. In addition, the single period of the liquid crystal alignment pattern of the first cholesteric liquid crystal layer 18G and the single period of the liquid crystal alignment pattern of the second cholesteric liquid crystal layer 20G are different from each other.

The liquid crystal diffraction element 10G including the first cholesteric liquid crystal layer 18G and the second cholesteric liquid crystal layer 20G selectively allows transmission of green light and diffracts the green light. In addition, the liquid crystal diffraction element 10G does not function on blue light and red light and thus allows transmission of blue light and red light.

The first cholesteric liquid crystal layer 18R and the second cholesteric liquid crystal layer 20R have a selective reflection wavelength in a red range. In addition, the single period of the liquid crystal alignment pattern of the first cholesteric liquid crystal layer 18R and the single period of the liquid crystal alignment pattern of the second cholesteric liquid crystal layer 20R are different from each other.

The liquid crystal diffraction element 10R including the first cholesteric liquid crystal layer 18R and the second cholesteric liquid crystal layer 20R selectively allows transmission of red light and diffracts the red light. In addition, the liquid crystal diffraction element 10R does not function on blue light and green light and thus allows transmission of blue light and green light.

In a case where light is incident into the laminated liquid crystal diffraction element 50 having the above-described configuration, blue light is diffracted by the liquid crystal diffraction element 10B, green light is diffracted by the liquid crystal diffraction element 10G, and red light is diffracted by the liquid crystal diffraction element 10R.

This way, the laminated diffraction element including liquid crystal diffraction elements having different selective wavelengths can selectively allow transmission of light components having different wavelength ranges and diffracts the light components.

Hereinabove, the liquid crystal diffraction element and the laminated diffraction element according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of Forming First Cholesteric Liquid Crystal Layer>

(Formation of Alignment Film)

A glass substrate was used as the support. The following coating liquid for forming an alignment film was applied to the support using a spin coater at 2500 rpm for 30 seconds. The support on which the coating film of the coating liquid for forming an alignment film was formed was dried using a hot plate at 60° C. for 60 seconds. As a result, an alignment film was formed.

Coating Liquid for Forming Alignment Film

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

—Material for Photo-Alignment—

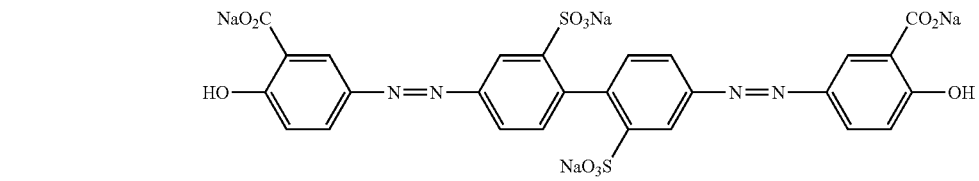

(Exposure of Alignment Film)

The alignment film was exposed using the exposure device shown in FIG. 4 to form a patterned alignment film P-1 having an alignment pattern.

In the exposure device, a laser that emits laser light having a wavelength (325 nm) was used as the laser. The exposure dose of the interference light was 300 mJ/cm². The single period Λ of an alignment pattern formed by interference of two laser beams was controlled to be a length shown in Table 1 below by changing an intersecting angle (intersecting angle α) between the two beams.

(Formation of Cholesteric Liquid Crystal Layer)

As the liquid crystal composition forming the first cholesteric liquid crystal layer, the following composition LC-1 was prepared.

Composition LC-1

| | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 5.18 parts by mass |
| Methyl ethyl ketone | 330.60 parts by mass |

Liquid Crystal Compound L-1

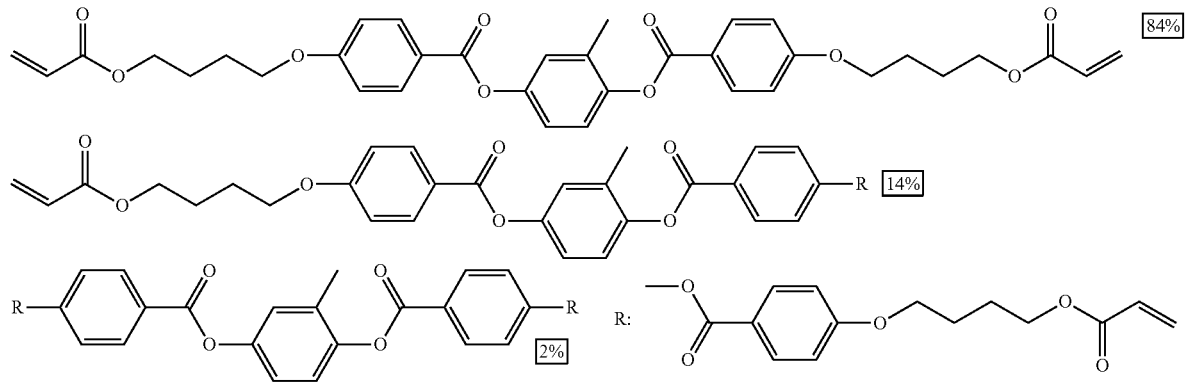

Chiral Agent Ch-1

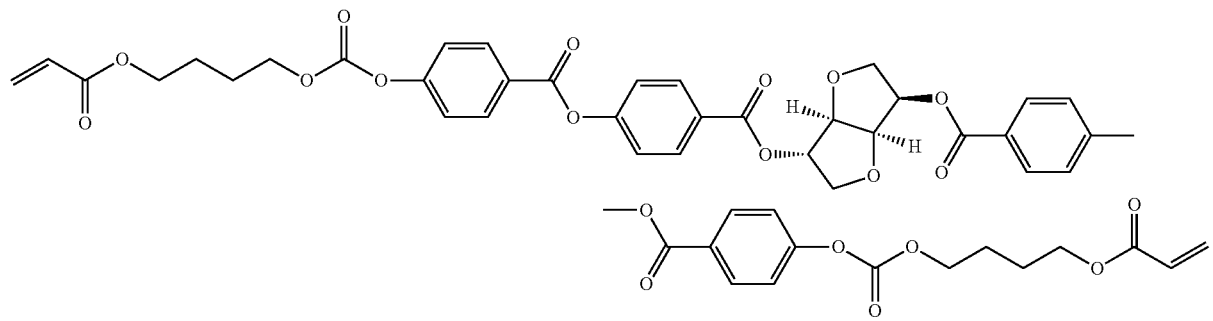

The above-described liquid crystal composition LC-1 was applied to the patterned alignment film P-1 using a spin coater at 800 rpm for 10 seconds. The coating film of the liquid crystal composition LC-1 was heated on a hot plate at 80° C. for 3 minutes (180 sec). Next, the coating film was irradiated with ultraviolet light having a wavelength of 365 nm at 80° C. at an irradiation dose of 300 mJ/cm² using a high-pressure mercury lamp in a nitrogen atmosphere. As a result, the liquid crystal composition LC-1 was cured, the alignment of the liquid crystal compound was immobilized, and a cholesteric liquid crystal layer was formed.

It was verified using a polarization microscope that the cholesteric liquid crystal layer had a periodically aligned surface as shown in FIG. 3.

The cholesteric liquid crystal layer was cut in a direction along the rotation direction of the optical axis, and a cross-section was observed with a SEM. By analyzing the SEM image, the single period Λ of the liquid crystal alignment pattern and the length pitch P of one helical pitch were measured. The measurement results are shown in Table 1. In addition, it was verified that bright portions and dark portions observed on a SEM cross-section were tilted with respect to the main surface. The bright portions and the dark portions were derived from a cholesteric liquid crystalline phase and observed, and a structure in which the bright portion and the dark portion are repeated twice corresponds to one helical pitch. The bright portions and the dark portions are formed to connect the liquid crystal compounds in which the directions of the optical axes match each other in the turning direction. That is, the bright portions and the dark portions match with the above-described equiphase surface.

<Preparation of Forming Second Cholesteric Liquid Crystal Layer>

A second cholesteric liquid crystal layer was prepared using the same method as that of the first cholesteric liquid crystal layer, except that the single period Λ of the alignment pattern was controlled to a length shown in Table 1 below by changing the intersecting angle α between the two beams during the exposure of the alignment film for forming the patterned alignment film.

<Preparation of Liquid Crystal Diffraction Element>

Figure 9:
FIG. 9 is a diagram conceptually showing still another example of the liquid crystal diffraction element according to the present invention.
Figure 10:
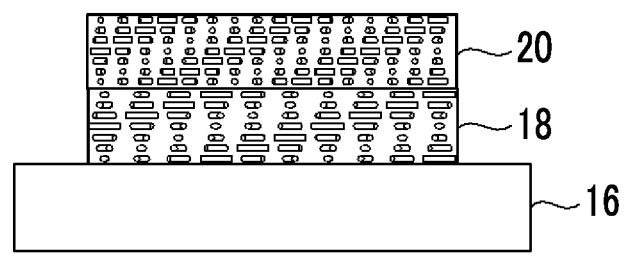
FIG. 10 is a diagram conceptually showing still another example of the liquid crystal diffraction element according to the present invention.

The first cholesteric liquid crystal layer was bonded to a surface of the second cholesteric liquid crystal layer through a pressure sensitive adhesive SK DINE (manufactured by Soken Chemical & Engineering Co., Ltd.), and the support of the first cholesteric liquid crystal layer was peeled off to prepare the liquid crystal diffraction element having the configuration shown in FIG. 9.

The first cholesteric liquid crystal layer and the second cholesteric liquid crystal layer were bonded to each other such that the one in-plane directions in which the directions of the optical axes changes while continuously rotating in the liquid crystal alignment patterns of the first cholesteric liquid crystal layer and the second cholesteric liquid crystal layer match each other and the tilt directions of the bright portions and the dark portions match each other.

Examples 2 and 3 and Comparative Example 1

Liquid crystal diffraction elements were prepared using the same method as that of Example 1, except that the amount of the chiral agent Ch-1 in the composition LC-1 was changed as shown in Table 1 to prepare the first cholesteric liquid crystal layer and the second cholesteric liquid crystal layer.

Example 4

Figure 8:
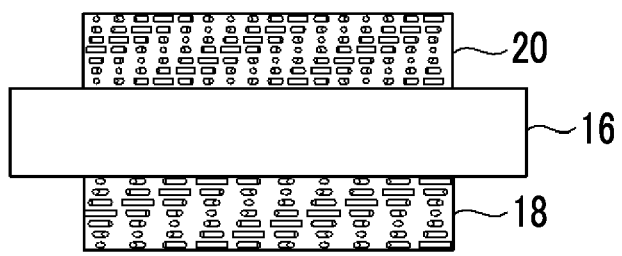
FIG. 8 is a diagram conceptually showing another example of the liquid crystal diffraction element according to the present invention.

The first cholesteric liquid crystal layer and the second cholesteric liquid crystal layer were prepared using the same method as that of Example 1, The second cholesteric liquid crystal layer was bonded to a surface of the support of the first cholesteric liquid crystal layer through a pressure sensitive adhesive SK DINE (manufactured by Soken Chemical & Engineering Co., Ltd.), and the support of the second cholesteric liquid crystal layer was peeled off to prepare the liquid crystal diffraction element having the configuration shown in FIG. 8.

[Evaluation]

Light components having predetermined wavelengths (450 nm, 532 nm, and 650 nm) were emitted from a direction perpendicular to one surface of each of the prepared liquid crystal diffraction elements, and the angle (polar angle) of the emitted light was measured.

The wavelength 450 nm of light used for the measurement was the selective reflection wavelength of the first cholesteric liquid crystal layer and the second cholesteric liquid crystal layer according to Examples 1 and 4 and Comparative Example 1, the wavelength 532 nm was the selective reflection wavelength of the first cholesteric liquid crystal layer and the second cholesteric liquid crystal layer according to Example 2, and the wavelength 650 nm was the selective reflection wavelength of the first cholesteric liquid crystal layer and the second cholesteric liquid crystal layer according to Example 3.

The results are shown in Table 1 below.

embodiment of the present invention diffracts light having the selective reflection wavelength while allowing the transmission of the light and allows transmission of light having a wavelength other than the selective reflection wavelength without diffracting the light. That is, it can be seen that the liquid crystal diffraction element according to the embodiment of the present invention is a transmission type diffraction element having wavelength selectivity.

As can be seen from the above results, the effects of the present invention are obvious.

The present invention is suitably applicable to various applications where light is refracted in an optical device such as a transmission type lens.

EXPLANATION OF REFERENCES

10: liquid crystal diffraction element
16: light guide member
18, 22: first cholesteric liquid crystal layer
20, 24: second cholesteric liquid crystal layer
21: cholesteric liquid crystal layer
30: support
32: alignment film
40: liquid crystal compound
40A: optical axis
60, 80: exposure device
62, 82: laser
64, 84: light source
65: $\lambda/2$ plate
68, 88, 94: polarization beam splitter
70A, 70B, 90A, 90B: mirror
72A, 72B, 96: $\lambda/4$ plate
92: lens

TABLE 1

| | | | Comparative Example 1 | Example 1 | Example 2 | Example 3 | Example 4 |
|---|---|---|---|---|---|---|---|
| First Cholesteric Liquid Crystal Layer | Single Period Λ | (μm) | 0.43 | 0.43 | 0.36 | 0.53 | 0.43 |
| | Helical Pitch P | (μm) | 0.37 | 0.37 | 0.30 | 0.43 | 0.37 |
| | Amount of Chiral Agent | (part(s) by mass) | 5.36 | 5.36 | 6.34 | 4.39 | 5.36 |
| Second Cholesteric Liquid Crystal Layer | Single Period Λ | (μm) | 0.43 | 0.50 | 0.42 | 0.61 | 0.50 |
| | Helical Pitch P | (μm) | 0.37 | 0.37 | 0.30 | 0.43 | 0.37 |
| | Amount of Chiral Agent | (part(s) by mass) | 5.36 | 5.36 | 6.34 | 4.39 | 5.36 |
| Laminating Order (Position of Glass Substrate) | | | Second Side | Second Side | Second Side | Second Side | Between First and Second Sides |
| Evaluation | Angle of Incidence Light | Wavelength 450 nm (°) | 0 | 0 | 0 | 0 | 0 |
| | | Wavelength 532 nm (°) | 0 | 0 | 0 | 0 | 0 |
| | | Wavelength 650 nm (°) | 0 | 0 | 0 | 0 | 0 |
| | Angle of Emitted Light | Wavelength 450 nm (°) | 0 | 0 | 10 | 0 | 0 |
| | | Wavelength 532 nm (°) | 0 | 10 | 0 | 0 | 10 |
| | | Wavelength 650 nm (°) | 0 | 0 | 0 | 10 | 0 |

It can be seen from Table 1 that, in Comparative Example 1 in which the single periods Λ of the liquid crystal alignment patterns of the first cholesteric liquid crystal layer and the second cholesteric liquid crystal layer were the same, all the light components having the wavelengths are transmitted without being diffracted. On the other hand, it can be seen that the liquid crystal diffraction element according to the $R_R$: right circularly polarized light of red light
M: laser light
MA, MB: beam
MP: P polarized light
MS: S polarized light
$P_O$: linearly polarized light
$P_R$: right circularly polarized light P$_L$: left circularly polarized light
Q: absolute phase
E: equiphase surface
L$_1$, L$_2$, L$_3$, L$_4$, L$_5$, L$_6$, L$_7$: light

What is claimed is:

1. A liquid crystal diffraction element comprising:
   a first cholesteric liquid crystal layer obtained by cholesteric alignment of a liquid crystal compound; and
   a second cholesteric liquid crystal layer that is laminated on the first cholesteric liquid crystal layer,
   wherein the first cholesteric liquid crystal layer and the second cholesteric liquid crystal layer have a liquid crystal alignment pattern in which a direction of an optical axis derived from the liquid crystal compound changes while continuously rotating in at least one in-plane direction,
   a selective reflection wavelength of the first cholesteric liquid crystal layer and a selective reflection wavelength of the second cholesteric liquid crystal layer are the same, and
   in a case where a length over which the direction of the optical axis derived from the liquid crystal compound in the liquid crystal alignment pattern rotates by 180° in a plane is set as a single period, a single period of the liquid crystal alignment pattern of the first cholesteric liquid crystal layer and a single period of the liquid crystal alignment pattern of the second cholesteric liquid crystal layer are different from each other.

2. The liquid crystal diffraction element according to claim 1,
   wherein the single period of the liquid crystal alignment pattern of the first cholesteric liquid crystal layer is less than the selective reflection wavelength of the first cholesteric liquid crystal layer, and
   the single period of the liquid crystal alignment pattern of the second cholesteric liquid crystal layer is less than the selective reflection wavelength of the second cholesteric liquid crystal layer.

3. The liquid crystal diffraction element according to claim 1,
   wherein a twisted direction of a helical structure of the first cholesteric liquid crystal layer and a twisted direction of a helical structure of the second cholesteric liquid crystal layer are the same.

4. The liquid crystal diffraction element according to claim 1,
   wherein the one in-plane direction in the liquid crystal alignment pattern of the first cholesteric liquid crystal layer matches the one in-plane direction in the liquid crystal alignment pattern of the second cholesteric liquid crystal layer.

5. The liquid crystal diffraction element according to claim 1,
   wherein at least one of the first cholesteric liquid crystal layer or the second cholesteric liquid crystal layer has regions in which lengths of the single periods of the liquid crystal alignment pattern are different in a plane.

6. The liquid crystal diffraction element according to claim 1,
   wherein the liquid crystal alignment pattern of each of the first cholesteric liquid crystal layer and the second cholesteric liquid crystal layer is a concentric circular pattern having a concentric circular shape where the one in-plane direction in which the direction of the optical axis derived from the liquid crystal compound changes while continuously rotating moves from an inside toward an outside.

7. A laminated diffraction element comprising:
   two or more liquid crystal diffraction elements according to claim 1,
   wherein selective wavelengths of the liquid crystal diffraction elements are different from each other.

8. The liquid crystal diffraction element according to claim 2,
   wherein a twisted direction of a helical structure of the first cholesteric liquid crystal layer and a twisted direction of a helical structure of the second cholesteric liquid crystal layer are the same.

9. The liquid crystal diffraction element according to claim 2,
   wherein the one in-plane direction in the liquid crystal alignment pattern of the first cholesteric liquid crystal layer matches the one in-plane direction in the liquid crystal alignment pattern of the second cholesteric liquid crystal layer.

10. The liquid crystal diffraction element according to claim 2,
    wherein at least one of the first cholesteric liquid crystal layer or the second cholesteric liquid crystal layer has regions in which lengths of the single periods of the liquid crystal alignment pattern are different in a plane.

11. The liquid crystal diffraction element according to claim 2,
    wherein the liquid crystal alignment pattern of each of the first cholesteric liquid crystal layer and the second cholesteric liquid crystal layer is a concentric circular pattern having a concentric circular shape where the one in-plane direction in which the direction of the optical axis derived from the liquid crystal compound changes while continuously rotating moves from an inside toward an outside.

12. A laminated diffraction element comprising:
    two or more liquid crystal diffraction elements according to claim 2,
    wherein selective wavelengths of the liquid crystal diffraction elements are different from each other.

13. The liquid crystal diffraction element according to claim 3,
    wherein the one in-plane direction in the liquid crystal alignment pattern of the first cholesteric liquid crystal layer matches the one in-plane direction in the liquid crystal alignment pattern of the second cholesteric liquid crystal layer.

14. The liquid crystal diffraction element according to claim 3,
    wherein at least one of the first cholesteric liquid crystal layer or the second cholesteric liquid crystal layer has regions in which lengths of the single periods of the liquid crystal alignment pattern are different in a plane.

15. The liquid crystal diffraction element according to claim 3,
    wherein the liquid crystal alignment pattern of each of the first cholesteric liquid crystal layer and the second cholesteric liquid crystal layer is a concentric circular pattern having a concentric circular shape where the one in-plane direction in which the direction of the optical axis derived from the liquid crystal compound changes while continuously rotating moves from an inside toward an outside.

16. A laminated diffraction element comprising:
    two or more liquid crystal diffraction elements according to claim 3,
    wherein selective wavelengths of the liquid crystal diffraction elements are different from each other.

17. The liquid crystal diffraction element according to claim 4,
   wherein at least one of the first cholesteric liquid crystal layer or the second cholesteric liquid crystal layer has regions in which lengths of the single periods of the liquid crystal alignment pattern are different in a plane.

18. The liquid crystal diffraction element according to claim 4,
   wherein the liquid crystal alignment pattern of each of the first cholesteric liquid crystal layer and the second cholesteric liquid crystal layer is a concentric circular pattern having a concentric circular shape where the one in-plane direction in which the direction of the optical axis derived from the liquid crystal compound changes while continuously rotating moves from an inside toward an outside.

19. A laminated diffraction element comprising:
   two or more liquid crystal diffraction elements according to claim 4,
   wherein selective wavelengths of the liquid crystal diffraction elements are different from each other.

20. A laminated diffraction element comprising:
   two or more liquid crystal diffraction elements according to claim 5,
   wherein selective wavelengths of the liquid crystal diffraction elements are different from each other.

* * * * *